United States Patent
Ibuki et al.

(10) Patent No.: US 8,318,301 B2
(45) Date of Patent: Nov. 27, 2012

(54) ANTIREFLECTION FILM, POLARIZING PLATE AND IMAGE DISPLAY DEVICE

(75) Inventors: Shuntaro Ibuki, Minami-Ashigara (JP); Tetsuya Asakura, Minami-Ashigara (JP); Katsumi Inoue, Minami-Ashigara (JP)

(73) Assignee: FUJIFILM Corporation, Tokyo (JP)

( * ) Notice: Subject to any disclaimer, the term of this patent is extended or adjusted under 35 U.S.C. 154(b) by 590 days.

(21) Appl. No.: 12/415,229

(22) Filed: Mar. 31, 2009

(65) Prior Publication Data

US 2009/0246490 A1    Oct. 1, 2009

(30) Foreign Application Priority Data

Mar. 31, 2008    (JP) ................. P2008-094236

(51) Int. Cl.
*B32B 5/16* (2006.01)
*B32B 7/02* (2006.01)
*G02B 1/04* (2006.01)

(52) U.S. Cl. ......... 428/327; 428/213; 428/220; 359/580
(58) Field of Classification Search .................. None
See application file for complete search history.

(56) References Cited

U.S. PATENT DOCUMENTS
2006/0063113 A1*  3/2006  Muramatsu ............ 430/323

FOREIGN PATENT DOCUMENTS

| EP | 1022115 A1 * | 7/2000 |
| JP | 2005-187770 A | 7/2005 |
| JP | 2007-148398 A | 6/2007 |
| JP | 2007-264113 A | 10/2007 |

OTHER PUBLICATIONS

JP2002-121226 Machine Translation. Published Apr. 23, 2002.*
JP2007-308634 Machine Translation. Published Nov. 29, 2007.*
PubChem Datasheets. Retrieved Jul. 8, 2011.*

* cited by examiner

*Primary Examiner* — Maria Veronica Ewald
*Assistant Examiner* — Prashant J Khatri
(74) *Attorney, Agent, or Firm* — Birch, Stewart, Kolasch & Birch, LLP.

(57) ABSTRACT

Provided is an antireflection film including, in the following order: a transparent support; at least one antiglare layer or diffusive layer containing a transparent resin and light-transmissive resin particles; and a low-refractivity layer having a refractive index lower than that of any of the transparent support and the antiglare layer or diffusive layer, wherein the transparent resin is formed by curing a mixture containing (A) a polyfunctional (meth)acrylate having at least two (meth)acryloyl groups, and (B) a modified polyfunctional (meth)acrylate modified through addition of any of ethylene oxide, propylene oxide or caprolactone, and the light-transmissive resin particles contain (C) high-crosslinking light-transmissive particles which are so high-crosslinking as to have a residual monomer content of at most 2.0% and which have a compression strength of from 39 to 98 $N/mm^2$.

18 Claims, 1 Drawing Sheet

ANTIREFLECTION FILM, POLARIZING PLATE AND IMAGE DISPLAY DEVICE

BACKGROUND OF THE INVENTION

1. Field of the Invention

The present invention relates to an antireflection film, a polarizing plate and an image display device.

2. Description of the Related Art

In general, an antireflection film is disposed on the outermost surface of image display devices such as cathode-ray tube display devices (CRT), plasma display panels (PDP), electroluminescent display devices (ELD) and liquid-crystal display devices (LCD). This is for preventing contrast reduction or image reflection owing to external light reflection on the displays, generally having a function of refractivity reduction owing to the principle of optical interference.

The antireflection film of the type is generally produced by forming, on a transparent support, a film of a low-refractivity layer having a suitable thickness and having a refractive index lower than that of the transparent support as an outermost layer of the film. For realizing its low refractivity, the material for the low-refractivity layer is desired to have a refractive index as low as possible. Since the antireflection film is disposed on the outermost surface of displays, it is desired to have high scratch resistance. In case where the support is a plastic film having a thickness of tens of μm to a few mm, a hard coat layer for compensating the poor indentation elasticity of the support is indispensable in addition to the strength of the film itself of the low-refractivity layer and the adhesiveness thereof to the underlying layer, for realizing high scratch resistance of the film. In particular, high scratch resistance has come to be required in recent applications such as TV panels and monitors, and the improvement of the indentation elasticity by a hard coat layer in addition to the strength of the film of the outermost layer is a significant theme in the art.

In addition, the recent tendency in the art is toward large-size high-definition TV panels and monitors, and it has become indispensable to make the hard coat layer have a function of light diffusion for retarding the display characteristic unevenness intrinsic to display devices. Two methods of making the layer have a function of light diffusion are known; one is an antiglare hard coat layer having both surface scatterability and internal scatterability (hereinafter this is referred to as "antiglare layer"), and the other is a diffusive hard coat layer having mainly internal scatterability (this is hereinafter referred to as "diffusive layer"). In both of the two, the mainstream is that resin particles or inorganic particles having a suitable refractive index and a suitable particle size are dispersed in the hard coat layer for attaining the light scatterability of the layer, as in JP-A 2007-264113 and JP-A 2005-187770.

As described in JP-A 2007-264113 and JP-A 2005-187770, the size of particles is an important factor for controlling the internal scatterability; but use of inorganic particles is problematic in that the precipitatability thereof is poor since the specific gravity thereof is high and that the film may be brittle since the hardness of the particles is high relative to that of the film. On the other hand, use of resin particles is also problematic in that the internal scatterability could be hardly in the optimum condition (in point of the refractive index and the particle size) since the particles are, differing from inorganic particles, swellable with solvent. In that situation, in order to make the layer have a controlled internal scatterability, it is desirable to lower as much as possible the swellability of the particles in solvent, as in JP-A 2007-148398, from the viewpoint of optical planning and production of the film. In this case where the swellability of the particles in solvent is reduced, however, it has been found that the optical film having the optimum internal scatterability in the initial state at room temperature and ordinary humidity is significantly degraded in point of its durability in a high-temperature high-humidity environment.

SUMMARY OF THE INVENTION

An object of the invention is to provide an antireflection film excellent in producibility, capable of overcoming a problem of display characteristic unevenness in display devices, and especially excellent in long-term durability under high-temperature high-humidity conditions that is needed by TV panels and monitors.

Another object of the invention is to provide a polarizing plate and an image display device comprising the antireflection film.

The present inventors have assiduously studied and, as a result, have found that, when combined with a specific binder, even use of high-crosslinking, high-strength resin particles can give an antireflection film excellent in long-term durability under high-temperature high-humidity conditions, and have completed the present invention.

Specifically, the invention has attained the above-mentioned objects, as comprising the following constitutions.

1. An antireflection film comprising, in the following order:
   a transparent support;
   at least one antiglare layer or diffusive layer containing a transparent resin and light-transmissive resin particles; and
   a low-refractivity layer having a refractive index lower than that of any of the transparent support and the antiglare layer or diffusive layer,
   wherein
   the transparent resin is formed by curing a mixture containing (A) a polyfunctional (meth)acrylate having at least two (meth)acryloyl groups, and (B) a modified polyfunctional (meth)acrylate modified through addition of any of ethylene oxide, propylene oxide or caprolactone, and
   the light-transmissive resin particles contain (C) high-crosslinking light-transmissive particles which are so high-crosslinking as to have a residual monomer content of at most 2.0% and which have a compression strength of from 39 to 98 N/mm$^2$.

2. The antireflection film as described in above 1, wherein
   in the modified polyfunctional (meth)acrylate (B), the addition molar number of ethylene oxide and propylene oxide is from 1 to 3, or the addition molar number of caprolactone is from 3 to 10.

3. The antireflection film as described in above 1 or 2, wherein
   the polyfunctional (meth)acrylate (A) has a mean molecular weight of from 200 to 600, and
   the modified polyfunctional (meth)acrylate (B) has a mean molecular weight of from 300 to 2000.

4. The antireflection film as described in any of above 1 to 3, wherein
   the antiglare layer or diffusive layer has a thickness (t) of from 8 μm to 15 μm,
   the high-crosslinking light-transmissive resin particles (C) has a mean particle size (φC) of from 5.5 μm to 10 μm,
   the high-crosslinking light-transmissive resin particles (C) has a refractive index (npC) of from 1.55 to 1.58, and
   (φC/t), which is a ratio of the mean particle size (φC) to the thickness (t), is from 0.30 to 0.75.

5. The antireflection film as described in any of above 1 to 4, wherein the antiglare layer or diffusive layer further contains (D) second high-crosslinking light-transmissive resin particles, and the second high-crosslinking light-transmissive resin particles (D) have substantially the same particle size as that of the high-crosslinking light-transmissive resin particles (C).

6. The antireflection film as described in above 5, wherein
the second high-crosslinking light-transmissive resin particles (D) have a refractive index of from 1.49 to 1.54.

7. The antireflection film as described in any of above 1 to 6, wherein
a swelling degree of the light-transmissive resin particles, after dipped in a dispersion solvent, is at most 20% by volume.

8. The antireflection film as described in any of above 1 to 7, wherein
the high-crosslinking light-transmissive resin particles (C) are crosslinked by a bifunctional or more polyfunctional crosslinking monomer, and
the crosslinking monomer is contained in an amount of at least 15% by mass relative to all monomers to form the high-crosslinking light-transmissive resin particles (C).

9. The antireflection film as described in above any of 1 to 8, wherein
the light-transmissive resin particles are resin particles prepared through polymerization of a (meth)acrylate monomer, 10. A polarizing plate comprising:
a polarizing film; and
two protective films that protect both surfaces of the polarizing film,
wherein
at least one of the protective films is the antireflection film of any of above 1 to 9.

11. An image display device comprising:
the antireflection film of any of above 1 to 9 or the polarizing plate of above 10.

DETAILED DESCRIPTION OF THE INVENTION

Figure 1A:
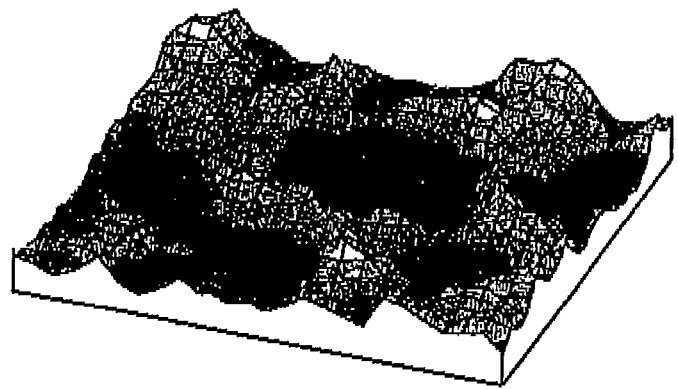
FIGS. 1A, 1B and 1C are views for explaining a method for measuring the mean tilt angle of the antireflection film of the invention.

The invention is described in detail hereinunder. Here, the expression "from (numerical value 1) to (numerical value 2)" as used in the context of the invention for indicating a physical value, a characteristic value or the like means "(numerical value 1) or more and (numerical value 2) or less". Also, the term "(meth)acrylate" means "at least either acrylate or methacrylate". The same applies to "(meth)acrylic acid" and the like.

The antireflection film has, as formed on a transparent support in that order, at least one antiglare layer or diffusive layer containing a transparent resin and light-transmissive resin particles and a low-refractivity layer having a refractive index lower than that of any of the transparent support and the antiglare layer or diffusive layer, wherein:

the transparent resin is formed by curing a mixture containing (A) a polyfunctional (meth)acrylate having at least two (meth)acryloyl groups, and (B) a modified polyfunctional (meth)acrylate modified through addition of any of ethylene oxide, propylene oxide or caprolactone, and
the light-transmissive resin particles contain (C) high-crosslinking light-transmissive particles which are so high-crosslinking as to have a residual monomer content of at most 2.0% and which have a compression strength of from 39 to 98 N/mm$^2$.

(Layer Constitution of Antireflection Film)

The antireflection film of the invention has at least one antiglare layer or diffusive layer on a transparent support. The antiglare layer and the diffusive layer in the invention are so constituted that light-transmissive resin particles are dispersed in a layer containing a transparent resin. The antiglare layer and the diffusive layer each may be a single layer or may be composed plural layers, for example, from 2 to 4 layers.

Preferred examples of the layer constitution of the antireflection film of the invention are shown below. In the following constitutions, the substrate film is meant to indicate a transparent support formed of a film.

Substrate film/antiglare layer or diffusive layer/low-refractivity layer;

Substrate film/antiglare layer or diffusive layer/antistatic layer/low-refractivity layer;

Substrate film/hard coat layer/antiglare layer or diffusive layer/low-refractivity layer;

Substrate film/hard coat layer/antiglare layer or diffusive layer/antistatic layer/low-refractivity layer;

Substrate film/hard coat layer/antistatic layer/antiglare layer or diffusive layer/low-refractivity layer;

Substrate film/antiglare layer or diffusive layer/high-refractivity layer/low-refractivity layer;

Substrate film/antiglare layer or diffusive layer/middle-refractivity layer/high-refractivity layer/low-refractivity layer;

Antistatic layer/substrate film/antiglare layer or diffusive layer/middle-refractivity layer/high-refractivity layer/low-refractivity layer;

Substrate film/antistatic layer/antiglare layer or diffusive layer/middle-refractivity layer/high-refractivity layer/low-refractivity layer;

Antistatic layer/substrate film/antiglare layer or diffusive layer/high-refractivity layer/low-refractivity layer/high-refractivity layer/low-refractivity layer.]

The antireflection film of the invention may have any other layer than the antiglare layer or the diffusive layer and the low-refractivity layer formed therein. The additional layer includes, for example, a hard coat layer, an antistatic layer, an antifouling layer, etc. More preferably, the antiglare layer or the diffusive layer additionally has functions of a hard coat layer, an antistatic layer, an antifouling layer, etc.

In the invention, the antireflection film has a constitution of middle-refractivity layer/high-refractivity layer/low-refractivity layer, from the viewpoint of low-refractivity; and the constitution is described in, for example, JP-A 8-122504, 8-110401, 10-300902, 2002-243906, 2000-111706. Of the above constitution, at least one of the middle-refractivity layer and the high-refractivity layer preferably has an additional function serving as an antistatic layer. In the three-layer constitution of middle-refractivity layer/high-refractivity layer/low-refractivity layer, preferably, the middle-refractivity layer has an additional function serving as an antistatic layer from the viewpoint of realizing the desired antistatic property and refractivity.

From the viewpoint of easy production and high producibility, the most preferred embodiment of the invention is an antireflection film having a single-layered antiglare layer or diffusive layer and a single-layered low-refractivity layer on a support in that order.

(Antiglare Layer or Diffusive Layer)

The antiglare layer or the diffusive layer in the invention contains a transparent resin and light-transmissive resin particles, in which the transparent resin is formed by curing a mixture containing (A) a polyfunctional (meth)acrylate having at least two (meth)acryloyl groups, and (B) a modified polyfunctional (meth)acrylate modified through addition of any of ethylene oxide, propylene oxide or caprolactone, and the light-transmissive resin particles contain (C) high-crosslinking light-transmissive particles having a residual monomer content of at most 2.0% and having a compression strength of from 39 to 98 N/mm².

Preferably, the high-crosslinking light-transmissive particles (C) have a mean particle size of from 5.5 μm to 10 μm, as will be described below. In the invention, the particle size means a primary particle size.

The high cross-linkage as referred to in the invention is indicated by the residual monomer content in the resin particles; and those having a lower residual monomer content are of higher cross-linkage.

The compression strength as referred to in the invention means the compression strength at which the particle size deforms by 10%. The compression strength at which the particle size deforms by 10% is a particle compression strength (S10 strength), which is computed by introducing the load to give 10% particle size deformation and the particle size before compression into the following formula:

$$S10 = 2.8P/(\pi d^2) \qquad (1).$$

In formula (1), S10 means the compression strength [N/mm²], P means the load to sample [N], and d means the particle size [mm]. Not specifically defined, the compression strength may be measured in any method capable of giving the above-mentioned parameters. For example, using a microcompression tester MCT-W Series (by Shimadzu), resin particles may be tested in a compression test at a constant load speed for each single resin particle, thereby determining the compression strength of the resin particles.

The antiglare layer or the diffusive layer in the invention can be formed by dispersing or dissolving the composition containing at least the above-mentioned ingredients (A) to (C), then applying the resulting coating liquid onto a transparent support, and drying and curing it thereon. The coating liquid may contain a polymerization initiator, preferably a polymer compound for controlling the viscosity of the coating liquid, and an inorganic particulate filler, a coating promoter or the like for curl reduction or refractivity control.

The antireflection film, the polarizing plate and the image display device of the invention must exhibit an excellent antiglare property in broad conditions in which light from various light sources may reflect on the device at various angles. As one example of evaluating the antiglare property in such various environments, there is known a method of evaluating the antiglare property by changing the thickness of the light source and the incident angle of light from the light source. Regarding the denseness of black in displays, the display device must attain good denseness of black in all cases where the display panel is watched in the vertical direction and in oblique direction thereto in light room environments.

[Transparent Resin]

The transparent resin in the antiglare layer or the diffusive layer in the invention is one formed by curing a mixture containing (A) a polyfunctional (meth)acrylate having at least two (meth)acryloyl groups to be described below.

The polyfunctional (meth)acrylate (B) having at least two (meth)acryloyl groups includes esters of polyalcohol and (meth)acrylic acid {e.g., ethylene glycol di(meth)acrylate, 1,4-cyclohexane diacrylate, pentaerythritol tetra(meth)acrylate, pentaerythirtol tri(meth)acrylate, trimethylolpropane tri(meth)acrylate, trimethylolethane tri(meth)acrylate, dipentaerythritol tetra(meth)acrylate, dipentaerythritol penta(meth)acrylate, dipentaerytlitol hexa(meth)acrylate, pentaeryiritol hexa(meth)acrylate, 1,2,3-cyclohexane tetra(meth)acrylate, polyurethane polyacrylate, polyester polyacrylate, etc.

For making the antiglare layer or the diffusive layer have a high refractive index, preferably, the monomer structure contains an aromatic ring as well as at least one selected from halogen atoms except fluorine, sulfur atom, phosphorus atom and nitrogen atom.

Also mentioned are resins having at least two (meth)acryloyl groups, for example, polyester resins, polyether resins, acrylic resins, urethane resins, alkyd resins, spiroacetal resins, polybutadiene resins, polythiol-polyene resins, and oligomers or prepolymers of polyfunctional compounds such as polyalcohols, having a relatively low molecular weight.

The transparent resin of the antiglare layer or the diffusive layer in the invention is formed by curing a mixture prepared by mixing (B) a modified polyfunctional (meth)acrylate modified through addition of any of ethylene oxide, propylene oxide or caprolactone, and the above (A). In the following description, ethylene oxide is abbreviated as "EO"; and propylene oxide is as "PO" The molar number of EO or PO is indicated by "n". In the oxide-added modified polyfunctional acylate monomer, the number n of EO or PO is preferably from 1 to 15, more preferably from 1 to 10, even more preferably from 1 to 6, still more preferably from 1 to 3. In the caprolactone-added modified polyfunctional acrylate monomer, n is preferably from 3 to 10, more preferably from 3 to 6, even more preferably from 3. In this expression, n indicated the mean value.

Concretely, (B) includes the following monomers, to which, however, the invention should not be limited, B-1: EO-added trimethylolpropane tri(meth)acrylate (n=1),
B-2: EO-added trimethylolpropane tri(meth)acrylate (n=1.5),
B-3: EO-added trimethylolpropane tri(meth)acrylate (n=2),
B-4: EO-added trimethylolpropane tri(meth)acrylate (n=6),
B-5: PO-added trimethylolpropane tri(meth)acrylate (n=1),
B-6: PO-added trimethylolpropane tri(meth)acrylate (n=2),
B-7: EO-added glycerin tri(meth)acrylate (n=2),
B-8: PO-added glycerin tri(meth)acrylate (n=2),
B-9: EO-added pentaerythritol tetra(meth)acrylate (n=2),
B-10: PO-added pentaerythritol tetra(meth)acrylate (n=2),
B-11: EO-added ditrimethylolpropane tetra(meth)acrylate (n=2),
B-12: PO-added ditrimethylolpropane tetra(meth)acrylate (n=2),
B-13; EO-added dipentaerythritol penta(meth)acrylate (n=1.5),
B-14: EO-added dipentaerythritol hexa(meth)acrylate (n=1),
B-15: PO-added dipentaerythritol penta(meth)acrylate (n=1.5),
B-16: PO-added dipentaerythritol hexa(meth)acrylate (n=1),
B-17: Tris(2-hydroxyethyl)isocyanurate tri(meth)acrylate
B-18: Caprolactone-added dipentaerythritol hexaacrylate (n=2),
B-19: Caprolactone-added dipentaerythritol hexaacrylate (n=3),
B-20: Caprolactone-added dipentaerythritol hexaacrylate (n=6).

These monomers may be combined for use herein.

As (B), preferred is EO-added trimethylolpropane tri(meth)acrylate. Of the above examples, more preferred are B-1, B-2 and B-10.

The blend ratio of the polyfunctional (meth)acrylate (A) and the modified polyfunctional (meth)acrylate (B) may fall within a range of from 10/1 to 1/10 (by weight), and the blend ratio may be suitably determined within the range, taking the balance of curling, brittleness and scratch resistance of the film having a planned thickness into consideration.

Preferably, the molecular weight of the polyfunctional (meth)acrylate monomer (A) falls within a range of from 200 to 600, and the molecular weight of the modified polyfunctional (meth)acrylate monomer (B) falls within a range of from 300 to 2000, both in terms of the mean molecular weight thereof. In this, the molecular weight is in term of the mean molecular weight, and the reason is because compounds having the same addition group introduction are difficult to obtain, and use of a mixture of compounds each having a different introduction ratio is practicable. Compounds having a molecular weight not lower than the lowermost limit of the above range are preferable from the viewpoint of the safety thereof, since their diffusion (penetration) speed into a support is not too high, they hardly cause surface defects, their penetration into a skin is not large, and they do not cause skin irritation and sensitization. On the other hand, compounds having a molecular weight not larger than the uppermost limit of the above range are also preferable since their diffusibility (penetrability) into a support is not too small, their adhesiveness is good, and the viscosity of the coating liquid containing the compound may not increase, and the liquid coatability is good.

The ethylenic unsaturated group having monomer may be polymerized through irradiation with ionizing radiations or under heat in the presence of a photoradical polymerization initiator or a thermal radical polymerization initiator. Accordingly, a coating liquid containing the ethylenic unsaturated group-having monomer, a photoradical polymerization initiator or a thermal radical polymerization initiator, particles, and optionally an inorganic filler, a coating promoter and other additives, an organic solvent and the like is prepared, and the coating liquid is applied onto a transparent support, and then cured thereon through polymerization by ionizing radiations or under heat to thereby form an antiglare layer or a diffusive layer. Preferably, curing with ionizing radiations and thermal curing are combined. As the photopolymerization and thermal polymerization initiators, usable are commercial compounds, which are described in "Newest UV Curing Technique" (by K. Takausu, the Association of Technical Information, 1991, page 159), and in Ciba Speciality Chemicals' catalogues.

Preferably, the polymerization initiator is used in an amount of from 0.1 to 15 parts by mass in terms of the total amount of the polymerization initiator, relative to 100 parts by mass of the above compound (A) or (B), more preferably from 1 to 10 parts by mass.

Preferably, the thickness of the antiglare layer or the diffusive layer is from 8 μm to 15 μm, more preferably from 10 μm to 15 μm, most preferably from 11 μm to 15 μm. When the thickness is at least 8 μm, then the surface unevenness of the film may not increase too much and the denseness of black in displays may be good in case where the light-transmissive resin particles to be mentioned below are used; and when the thickness is at most 15 μm, it is preferable since the producibility may be good and the film may not curl and may not be brittle, and since the film is suitable to thin and flat display panels.

[Light-Transmissive Resin Particles]

The antiglare layer or the diffusive layer in the invention contains light-transmissive resin particles, and the light-transmissive resin particles contain (C) high-crosslinking light-transmissive particles having a residual monomer content of at most 2.0% to be of high cross-linkage and having a compression strength of from 39 to 98 $N/mm^2$ (hereinafter this may be referred to as "particles (C)").

The particles (C) have a residual monomer content of at most 2.0%, more preferably at most 1.0%. When the residual monomer content is at most 2.0%, then the particles may be sufficiently crosslinked, therefore hardly causing a problem in that the resin particles may swell in the solvent in the coating liquid and the particle size may be deviated from one necessary for surface scattering of the particles. The residual monomer content may be determined as follows: The monomer remaining uncrosslinked in the resin particles is extracted out with a solvent, and the monomer amount in the extract is quantitatively determined through gas chromatography. A concrete method for the measurement is described in the section of Examples given hereinunder.

Preferably, the mean particle size ($\phi C$) of the particles (C) is from 5.5 μm to 10 μm, and the refractive index (npC) thereof is from 1.55 to 1.58.

The refractive index (npC) of the particles (C) is preferably from 1.55 to 1.58, more preferably from 1.56 to 1.57. When the refractive index of the particles (C) is at east 1.55, then the affinity between the binder formed of the mixture that contains (A) a polyfunctional (meth)acrylate having at least two (meth)acryloyl groups and (B) a modified polyfunctional (meth)acrylate and the particles may be high, and the dispersibility of the particles in the binder acrylate may be retarded with the result that the particles may sufficiently aggregate in the film, and the film may satisfy both the requirement for excellent antiglare property and the requirement for good denseness of black in displays. On the other hand, when the refractive index of the particles is at most 1.58, then it is favorable since the affinity between the binder formed of the mixture containing the above (A) and (B) may not lower so much, the aggregation of the particles may be on a suitable level, the film surface unevenness may not increase so much, the film may not yellow to worsen, and the contrast under light environments may increase.

The refractive index of the particles described in the invention is based on the refractive index of crosslinked polymethyl methacrylate particles of 1.49 and on the refractive index of crosslinked polystyrene particles of 1.59.

Regarding the refractive index of particles, there is known a method of measuring it by dispersing the same amount of light-transmissive particles in a mixed solvent, as prepared by mixing at least two selected from methylene iodide, 1,2-dibromopropane and n-hexane each having a different refractive index, in a varying blend ratio to have a varying refractive index, then measuring the turbidity of each dispersion, and measuring the refractive index of the solvent having the smallest turbidity with an Abbe's refractometer. When the refractive index of the particles is measured according to the method, the found data is larger by 0.01 than the above-mentioned refractive index. (For example, the refractive index of crosslinked polymethyl methacrylate particles is 1.50.) Accordingly, in case where the refractive index of particles is determined according to the method, the value smaller by 0.01 than the found data may be compared with the refractive index as referred to in this description.

As described in the above, the mean particle size ($\phi C$) of the particles (C) is preferably from 5.5 μm to 10 μm, more preferably from 5.5 μm to 9.0 μm, even more preferably from 5.5 μm to 8.5 μm. When the particle size is at least 5.5 μm, then the denseness of black in displays may increase, and the film may satisfy both the requirement for excellent antiglare property and the requirement for good denseness of black in displays. If so, in addition, light scattering at large angles does not increase, and the contrast increases. When the particle size is at most 10 µm, then the antiglare property may be bettered and the film may satisfy both the requirement for excellent antiglare property and the requirement for good denseness of black in displays. If so, in addition, the surface roughness may be reduced and the film may have good appearance. Further, the degree of light scattering does not increase and the effect of glaring inhibition is sufficient.

According to the invention, preferably, the ratio of the mean particle size ($\phi C$) of the particles (C) to the thickness (t) of the antiglare layer or the diffusive layer, ($\phi C/t$) is defined to fall within a specific range. Specifically, $\phi C/t$ is preferably from 0.30 to 0.75, more preferably from 0.35 to 0.65, even more preferably from 0.40 to 0.65. When $\phi C/t$ is too large, then the film surface may be too rough and its outward appearance may be poor; but when too small, then the denseness of black in displays may be poor. In the invention, when the film thickness (t), the refractive index (npC) of the particles (C), the mean particle size ($\phi C$) thereof, and the ratio of the particle size ($\phi C$) to the film thickness (t), ($\phi C/t$) all satisfy the above-mentioned ranges, the film satisfying both the requirement for especially excellent antiglare property and the requirement for especially good denseness of black in displays in light room environments, and having an appearance which is sufficient in glaring inhibition, improved in contrast, and especially excellent in image visibility can be obtained. The antireflection film can endure long usage.

In the invention, for the purpose of attaining a desired internal scatterability, preferably used are the light-transmissive resin particles of which the refractivity difference from the transparent resin falls within a specific range. For the purpose of attaining a preferred internal scatterability, the refractivity difference between the particles (C) and the binder is preferably from 0.02 to 0.20, more preferably from 0.02 to 0.10, most preferably from 0.02 to 0.07. More preferably, the refractive index of the particles (C) satisfies the above-mentioned refractivity difference and is higher than the refractive index of the binder.

In the invention, for further enhancing the internal scatterability, preferably used are (D) second high-crosslinking light-transmissive resin particles (hereinafter this may be referred to as particles (D)) in addition to the particles (C). In case where the particles (D) are added, preferably, their refractivity falls within the range to be mentioned below. When the refractivity thereof is too high, then the affinity of the particles (D) for the binder may be poor and the particles (D) may aggregate strongly and may therefore worsen the antiglare property and the denseness of black in displays brought about by the particles (C). Accordingly, for retarding the aggregation of the particles (D), the refractive index of the particles (D) is preferably from 1.49 to 1.54, more preferably from 1.49 to 1.52, even more preferably from 1.49 to 1.51. The refractive index of the light-transmissive resin particles has influences on both the aggregation of the particles and the internal scatterability thereof in a binder, and therefore it is especially desirable to combine the particles (C) and the particles (D) for use in the film in the invention for the purpose of controlling the two to fall within the optimum ranges in the invention.

In order to not worsen the good antiglare property and the good denseness of black in displays brought about by the particles (C), preferably, the particle size of the particles (C) is substantially the same as that of the particles (D). "Substantially the same" as referred to herein means that the ratio of the mean particle size ($\phi D$) of the particles (D) to the mean particle size ($\phi C$) of the particles (C), ($\phi D/\phi C$) is from 0.90 to 1.10, more preferably from 0.95 to 1.05, even more preferably from 0.97 to 1.03. When the particle size ratio falls within the above range, then the surface condition of the film may not change and this is favorable from the viewpoint of the antiglare property of the film and the denseness of black in displays.

Preferably, the amount of the particles (C) to be added is from 3 to 20% by mass of the total solid content of the antiglare layer or the diffusive layer, more preferably from 4 to 15% by mass, most preferably from 5 to 13% by mass. In case where the particles (D) are added, then the sum total of the particles (C) and the particles (D) is preferably from 4 to 30% by mass of the total solid content of the antiglare layer or the diffusive layer, more preferably from 6 to 25% by mass, even more preferably from 8 to 20% by mass. The blend ratio of the particles (C) and the particles (D) is preferably such that the amount of the particles (C) is at least 50% by mass of the sum total of the particles (C) and the particles (D), more preferably at least 60% by mass, even more preferably at least 70% by mass. The uppermost limit of the amount of the particles (C) may be at most 100% by mass, but preferably at most 90% by mass. Any other particles than the particles (C) and the particles (D) may also be added to the film. In this case, however, the additional particles are preferably such that the particle size or the refractive index thereof satisfies the preferred range thereof of either the particles (C) or the particles (D). In case where the additional particles do not satisfy the preferred ranges of the particle size and the refractive index of the particles (C) and the particles (D), the amount of the additional particles is preferably at most 30% by mass of the sum total of the particles (C) and the particles (D), more preferably at most 20% by mass, even more preferably at most 10% by mass, most preferably at most 0% by mass.

The particles (C) and the particles (D) may be selected from the particles described below, in accordance with the refractive index and the mean particle size thereof described in the above.

The light-transmissive resin particles are preferably resin particles prepared through polymerization of a (meth)acrylate monomer. As specific examples of the light-transmissive resin particles, preferably mentioned are, for example, resin particles such as crosslinked polymethyl (meth)acrylate particles, crosslinked methyl (meth)acrylate/styrene copolymer particles, crosslinked polystyrene particles, crosslinked methyl (meth)acrylate/methyl acrylate copolymer particles, crosslinked acrylate/styrene copolymer particles, melamine/formaldehyde resin particles, benzoguanamine/formaldehyde resin particles, etc. Of those, preferred are crosslinked styrene particles, crosslinked polymethyl (meth)acrylate particles, crosslinked methyl (meth)acrylate/styrene copolymer particles, etc. Also preferred are so-called surface-modified particles prepared by chemically bonding a compound having a fluorine atom, a silicon atom, a carboxyl group, a hydroxyl group, an amino group, a sulfonic acid group, a phosphoric acid group or the like to the surface of those resin particles; and particles prepared by bonding nano-size inorganic fine particles of silica, zirconia or the like to the surfaces of the resin particles.

In case where the refractive index of an antiglare layer or diffusive layer excluding resin particles is made to be at most 1.54, more preferably at most 1.53 for the purpose of reducing the coating unevenness and the interference unevenness or for reducing the production cost, the particles (C) in the invention are more preferably crosslinked polymethyl (meth)acrylate particles, or crosslinked methyl (meth)acrylate/styrene copolymer particles. Even more preferred are crosslinked methyl (meth)acylate/styrene copolymer particles. In case where crosslinked methyl (meth)acrylate/styrene copolymer particles are used, the copolymerization ratio of styrene therein is preferably from 55% to 95%, more preferably from 60% to 90%, even more preferably from 65% to 85%. The particles (D) are more preferably crosslinked polymethyl (meth)acrylate particles, or crosslinked methyl (meth)acrylate/styrene copolymer particles. In case where crosslinked methyl (meth)acrylate/styrene copolymer particles are used, the copolymerization ratio of styrene therein is preferably from 0% to 50%, more preferably from 0 to 30%, even more preferably from 0 to 20%. When the copolymerization ratio of styrene in the particles (C) and the particles (D) is defined to fall within the above range, then the refractive index of the particles may fall within the preferred range as above.

The compression strength of the particles (C) is from 39 $N/mm^2$ to 98 $N/mm^2$, preferably from 44.1 $N/mm^2$ to 88.2 $N/mm^2$, more preferably from 49.0 $N/mm^2$ to 78.4 $N/mm^2$. Within the range, the particles may contribute toward increasing the film hardness and may hardly undergo particle fracture as not increasing the brittleness thereof.

In the invention, the swelling degree is determined as follows: Resin particles are dispersed in a dispersion solvent to have a concentration of 30% by mass. The particle size ($r_1$) is measured within 3 hours alter the end of dispersing the particles. The dispersion is statically kept at room temperature (25° C.) for a while, and at the equilibrium state at which the increase in the particle size has stopped, the particle size ($r_2$) is again measured. The swelling degree is computed according to the following formula (2):

$$\text{Swelling Degree}(\% \text{ by volume}) = \{(r_2/r_1)^3 - 1\} \times 100 \quad (2).$$

The swelling degree is preferably at most 20% by volume, more preferably at most 15% by volume, even more preferably at most 10% by volume. When the swelling degree is at most 20% by volume, the scattering characteristic fluctuation to be caused by the particle size fluctuation may be low, and for example, the scattering characteristic such as typically the haze of the film is prevented from varying in producing the, as not depending on the swelling condition of the particles in the film, and therefore, an optical film of high uniformity can be produced.

The crosslinking degree of the resin particles is preferably as high as possible within a range within which the particles can keep dissolution resistance. The crosslinking degree of the resin particles in the invention may be based on the content of the crosslinking monomer relative to all the monomers participating in forming the particles. Preferably, the content of the crosslinking monomer is at least 15% by mass for increasing the film hardness, more preferably from 17% by mass to 50% by mass, even more preferably from 20% by mass to 40% by mass.

Regarding the shape thereof, the particles (C) and the particles (D) may be true spherical or may be amorphous, but are preferably true spherical. Regarding the particle size distribution thereof, the particles are preferably monodispersed particles from the viewpoint of the haze, the diffusibility control, and the coated surface homogeneousness of the film. For example, when the particles having a particle size larger by at least 20% than the mean particle size are defined as coarse particles, the proportion of the coarse particles is preferably at most 1% of all the particles, more preferably at most 0.1%, even more preferably at most 0.01%. When the amount of the coarse particles is too large, then it is unfavorable since the surface roughness of the film may be remarkable.

Particles having a particle size smaller by at least 16% than the mean particle size are defined as ultrafine particles. Preferably, the proportion of such ultrafine particles is at most 10% of the number of all particles, more preferably at most 6%, even more preferably at most 4%.

The particles having such a particle size distribution can be prepared by classifying the particles produced in an ordinary method, and by increasing the classification frequency and by enhancing the classification performance, particles having a more preferred particle size distribution can be prepared. For the classification, preferred are methods of pneumatic classification, centrifugal classification, precipitating classification, filtration classification, electrostatic classification, etc.

The particle size distribution of the particles may be determined according to a Coulter counter methods in which the found data are converted into a particle number distribution. The mean particle size may be computed from the thus-obtained particle distribution.

[Other Additives]

The antiglare layer or the diffusive layer in the invention may contain other additives in addition to the above-mentioned ingredients.

The antiglare layer or the diffusive layer in the invention may contain a polymer compound. The polymer compound, if any, may reduce the curing shrinkage of the film and may control the viscosity of the coating liquid.

The polymer compound is already in the form of a polymer when it is added to the coating liquid; and the polymer compound includes, for example, resins such as cellulose esters (e.g., cellulose triacetate, cellulose diacetate, cellulose propionate, cellulose acetate propionate, cellulose acetate butyrate, cellulose nitrate), urethane acrylates, polyester acrylates, poly(meth)acrylates (e.g., methyl methacrylate/methyl (meth)acrylate copolymers, methyl methacrylate/ethyl(meth)acrylate copolymers, methyl methacrylate/butyl (meth)acrylate copolymers, methyl methacrylate/styrene copolymers, methyl methacrylate/(meth)acrylic acid copolymers, polymethyl methacrylate), polystyrene.

Preferably, the amount of the polymer compound to be added is from 1 to 50% by mass relative to the entire binder in the layer containing the polymer compound, more preferably from 5 to 40% by mass, from the viewpoint of the effect against curing shrinkage and the effect for increasing the viscosity of the coating liquid.

Preferably, the mass-average molecular weight of the polymer compound is from 3,000 to 400,000, more preferably from 5,000 to 300,000, even more preferably from 5,000 to 200,000.

An inorganic filler may be added to the antiglare layer or the diffusive layer in the invention, in addition to the above-mentioned particles (C) and particles (D) therein, for the purpose of refractivity control, film strength control, and curing shrinkage reduction and, when a low-refractivity layer is further formed in the film, for the purpose of refractivity reduction in the layer. For example, the inorganic filler is a high-refractivity fine-particulate inorganic filler of an oxide containing at least one metal element selected from titanium, zirconium, aluminium, indium, zinc, tin and antimony. The mean particle site of the primary particles of the filler may be generally at most 0.2 μm, preferably at most 0.1 μm, more preferably from 1 nm to 0.06 μm.

On the contrary, in case where the refractive index of the antiglare layer or diffusive layer excluding resin particles is desired to be lowered for the purpose of refractivity difference control between the particles (C) and the particles (D), a low-refractivity fine-particulate inorganic filler may be added to the layer. The inorganic filler of the type includes silica fine particles, silica hollow particles, etc. The preferred particle size of the particles may be the same as that of the above-mentioned high-refractivity fine-particulate inorganic filler.

Also preferably, the surfaces of the inorganic filler particles may be processed for silane coupling treatment or titanium coupling treatment, for which, preferred is a surface-treating agent that may give a functional group capable of reacting with the binder to the filler surface.

The amount of the inorganic filler to be added is preferably from 10 to 90% by mass of the total mass of the binder in the antiglare layer or the diffusive layer, more preferably from 20 to 80% by mass, even more preferably from 30 to 75% by mass.

The particle size of the inorganic filler is much shorter than the wavelength of light, and therefore the inorganic filler does not cause light scattering therearound, and the dispersion of the filler in a binder polymer may have the property of an optically uniform substance.

Especially for the purpose of securing the surface uniformity free from coating unevenness, drying unevenness and spot defects of the antiglare layer and the diffusive layer in the invention, the coating composition for the antiglare layer or the diffusive layer preferably contains any one or both of a fluorine-containing surfactant and a silicone-based surfactant. In particular, a fluorine-containing surfactant is preferred, since it is, even though used in a smaller amount, more effective for preventing surface failures such as coating unevenness, drying unevenness and spot defects of the anti-reflection film of the invention.

This is for the purpose of securing high-speed coatability of the coating liquid with increasing the surface uniformity of the formed film, thereby increasing the producibility of the film of the invention.

Preferred examples of the fluorine-containing surfactant are, for example, the compounds described in JP-A 2007-188070, paragraphs [0049] to [0074].

The preferred amount of the surfactant (e.g., fluoropolymer) for use in the antiglare layer or the diffusive layer in the invention is within a range of from 0.001 to 5% by mass of the coating liquid, more preferably from 0.005 to 3% by mass, even more preferably from 0.01 to 1% by mass. When the amount of the fluoropolymer is at least 0.001% by mass, the polymer is sufficiently effective; and when at most 5% by mass, the coating film may be sufficiently dried and may have good properties (e.g., reflectivity, scratch resistance).

An organic solvent may be added to the coating composition to form the antiglare layer or the diffusive layer.

The organic solvent includes alcohols such as methanol, ethanol, n-propanol, isopropanol, n-butanol, isobutanol, sec-butanol, tert-butanol, isoamyl alcohol, 1-pentanol, n-hexanol, methylamyl, alcohol; ketones such as methyl isobutyl ketone (MIBK), methyl ethyl ketone (MEK), diethyl ketone, acetone, cyclohexanone, diacetone alcohol; esters such as methyl acetate, ethyl acetate, n-propyl acetate, isopropyl acetate, isobutyl acetate, n-butyl acetate, isoamyl acetate, n-amyl acetate, methyl propionate, ethyl propionate, methyl butyrate, ethyl butyrate, methyl lactate, ethyl lactate; ethers and acetals such as 1,4-dioxane, tetrahydrofuran, 2-methylfuran, tetrahydropyran, diethyl acetal; hydrocarbons such as hexane, heptane, octane, isooctane, ligroin, cyclohexane, methylcyclohexane, toluene, xylene, ethylbenzene, styrene, divinylbenzene; halogenohydrocarbons such as carbon tetrachloride, chloroform, methylene chloride, ethylene chloride, 1,1,1-trichloroethane, 1,1,2-trichloroethane, trichloroethylene, tetrachloroethylene, 1,1,1,2-tetrachloroethane; polyalcohols and their derivatives such as ethylene glycol, ethylene glycol monomethyl ether, ethylene glycol monoethyl ether, ethylene glycol monoacetate, diethylene glycol, propylene glycol, dipropylene glycol, butanediol, hexylene glycol, 1,5-pentanediol, glycerin monoacetate, glycerin ethers, 1,2,6-hexanetriol; fatty acids such as formic acid, acetic acid, propionic acid, butyric acid, isobutyric acid, isovaleric acid, lactic acid; nitrogen compounds such as formamide, N,N-dimethylformamide, acetamide, acetonitrile; sulfur compounds such as dimethyl sulfoxide, etc.

As the organic solvent, preferred are methyl isobutyl ketone, methyl ethyl ketone, cyclohexanone, acetone, toluene, xylene, ethyl acetate, 1-pentanol. For aggregation control, a solvent of alcohol or polyalcohol may also be mixed with the organic solvent for use herein. One or more these organic solvents may be used either singly or as combined. Preferably, the total amount of the organic solvent in the coating composition is from 20% by weight to 90% by weight, more preferably from 30% by weight to 80% by weight, most preferably from 40% by weight to 70% by weight. For stabilizing the surface condition of the antiglare layer or the diffusive layer, preferably used is a combination of a solvent having a boiling point of lower than 100° C. and a solvent having a boiling point of not lower than 100° C.

Preferably, the antiglare layer of the diffusive layer is formed by applying a coating liquid to a support, and then processing it through photoirradiation, electron beam irradiation or heat treatment for crosslinking or polymerization. For UV irradiation, usable are UV rays from a light source of ultra-high-pressure mercury lamp, high-pressure mercury lamp, low-pressure mercury lamp, carbon arc, xenon arc, metal halide lamp, etc.

Preferably, the UV curing is attained in an atmosphere having an oxygen concentration reduced through nitrogen purging to at most 4% by volume, more preferably at most 2% by volume, most preferably at most 0.5% by volume.

(Low-Refractivity Layer)

The antireflection film of the invention has a low-refractivity layer for reducing the reflectivity thereof. Preferably, the refractive index of the low-refractivity layer is from 1.20 to 1.46, more preferably from 1.25 to 1.46, even more preferably from 1.30 to 1.40.

Preferably, the thickness of the low-refractivity layer is from 50 to 200 nm, more preferably from 70 to 100 nm. Preferably, the haze of the low-refractivity layer is at most 3%, more preferably at most 2%, most preferably at most 1%.

Preferred embodiments of the curable composition to form the low-refractivity layer are the following:

(1) A composition containing a fluorine-containing compound having a crosslinking or polymerizing functional group.

(2) A composition comprising, as the main ingredient thereof, a hydrolyzed condensate of a fluorine-containing organosilane material.

(3) A composition containing a monomer having at least two ethylenic unsaturated groups and inorganic fine particles (in which, more preferably, the inorganic fine particles have a hollow structure).

Preferably, the composition (1) and the composition (2) contains inorganic fine particles, in which, more preferably, the inorganic fine particles have a hollow structure from the viewpoint of further reducing the refractive index of the layer.

(1) Composition Containing a Fluorine-Containing Compound Having a Crosslinking or Polymerizing Functional Group:

As the fluorine-containing compound having a crosslinking or polymerizing functional group, there is mentioned a copolymer of a fluoromonomer and a monomer having a crosslinking or polymerizing functional group. Specific examples of the fluoropolymer are described in JP-A 2003-222702, 2003-183322.

If desired, the above polymer may be combined with a curing agent having a polymerizing unsaturated group, as in JP-A 2000-17028. Preferably, the polymer may be combined with a fluorine-containing compound having a polyfunctional polymerizing unsaturated group, as in JP-A 2002-145952. Examples of the compound having a polyfunctional polymerizing unsaturated group include the above-mentioned monomer having at least two ethylenic unsaturated groups. Also preferred are hydrolyzed condensates of organosilane, as in JP-A 2004-170901; and more preferred are hydrolyzed condensates of (meth)acryloyl group-having organosilane.

These compounds are especially preferably combined with a polymer compound having a polymerizing unsaturated group by itself, as more effective for improving the scratch resistance of the film.

In case where the polymer could not have sufficient curability by itself, a crosslinking compound is preferably combined with it, as capable of imparting sufficient curability to the polymer. For example, in case where the polymer has a hydroxyl group therein, various amino compounds are preferably used as the curing agent for the polymer. The amino compounds that are used as crosslinking compounds are, for example compounds having at least two, in total, of any one or both of a hydroxyalkylamino group and an alkoxyalkylamino group. Concretely, for example, they include melamine compounds, urea compounds, benzoguanamine compounds, glycoluryl compounds. Preferably, an organic acid or its salt is used for curing these compounds.

(2) Composition Comprising, as the Main Ingredient Thereof, a Hydrolyzed Condensate of a Fluorine-Containing Organosilane Material:

The composition comprising, as the main ingredient thereof, a hydrolyzed condensate of a fluorine-containing organosilane compound is also preferred as having a low refractive index and capable of forming a film having a high surface hardness. Preferred is a condensate of a compound having a hydrolyzable silanol at one terminal or both terminals of the fluoroalkyl group, and a tetraalkoxysilane. Concrete examples of the composition are described in JP-A 2002-265866 and 2002-317152.

(3) Composition Containing a Monomer Having at Least Two Ethylenic Unsaturated Groups and Inorganic Fine Particles Having a Hollow Structure:

As still another preferred embodiment, there is mentioned a low-refractivity layer comprising low-refractivity particles and a binder. The low-refractivity particles may be organic or inorganic, but are preferably particles having pores inside them. As specific examples of the hollow particles, there are mentioned silica particles described in JP-A 2002-79616. The refractive index of the particles is preferably from 1.15 to 1.40, more preferably from 1.20 to 1.30. As the binder, there is mentioned a monomer having at least two ethylenic unsaturated groups as in the section of the antiglare layer or the diffusive layer given hereinabove.

Preferably, a polymerization initiator such as that described in the section of the antiglare layer or the diffusive layer given hereinabove is added to the low-refractivity layer. In case where the layer contains a radical-polymerizing compound, the polymerization initiator may be in the layer in an amount of from 1 to 10% by mass relative to the compound, preferably from 1 to 5% by mass.

Inorganic particles may be added to the low-refractivity layer in the invention. For enhancing the scratch resistance of the low-refractivity layer, fine particles may be added thereto having a particle size of from 15% to 150% of the thickness of the layer, preferably from 30% to 100%, more preferably from 45% to 60%.

Any known polysiloxane-base or fluorine-containing antifouling agent, lubricant and the like may be added to the low-refractivity layer in the invention for the purpose of imparting fouling resistance, waterproofness, chemical resistance, lubricity or the like characteristics to the layer.

As the polysiloxane structure-having additive, preferred for use herein are reactive group-containing polysiloxanes {e.g., "KF-100T", "X-22-169AS", "KF-102", "X-22-3701IE", "X-22-164B", "X-22-5002", "X-22-173B", "X-22-174D", "X-22-167B", "X-22-161AS" (trade names, all by Shin-etsu Chemical Industry); "AK-5", "AK-30", "AK-32" (trade names, all by Toa Gosei): "Silaplane FM0725", "Silaplane FM0721" (trade names, both by Chisso)}. Also preferred are the silicone compounds listed in Table 2 and Table 3 in JP-A 2003-112383.

As the fluorine-containing compound, preferred are compounds having a fluoroalkyl group. The fluoroalkyl group preferably has from 1 to 20 carbon atoms, more preferably from 1 to 10 carbon atoms. It may be linear (e.g., $-CF_2CF_3$, $-CH_2(CF_2)_4H$, $-CH_2(CF_2)_8CF_3$, $-CH_2CH_2(CF_2)_4H$), or may have a branched structure (e.g., $CH(CF_3)_2$, $CH_2CF(CF_3)_2$, $CH(CH_3)CF_2CF_3$, $CH(CH_3)(CF_2)_5CF_2H$), or may have an alicyclic structure (preferably a 5-membered or 6-membered cyclic structure, e.g., perfluorocyclohexyl group, perfluorocyclopentyl group, or alkyl group substituted with any of these), or may have an ether bond (e.g., $CH_2OCH_2CF_2CF_3$, $CH_2CH_2OCH_2C_4F_8H$, $CH_2CH_2OCH_2CH_2C_8F_{17}$, $CH_2CH_2OCF_2CF_2OCF_2CF_2H$). One molecule of the compound may have two or more such fluoroalkyl groups.

Preferably, the fluorine-containing compound additionally has a substituent contributing toward bond formation or compatibility with the low-refractivity layer film. Preferably, the compound has two or more such substituents which may be the same or different. Preferred examples of the substituents include an acryloyl group, a methacryloyl group, a vinyl group, an aryl group, a cinnamoyl group, an epoxy group, an oxetanyl group, a hydroxyl group, an polyoxyalkylene group, a carboxyl group, an amino group, etc. The fluorine-containing compound may be a polymer or an oligomer with a compound not containing a fluorine atom, and its molecular weight is not specifically defined. Also not specifically defined, the fluorine atom content of the fluorine-containing compound is preferably at least 20% by mass, more preferably from 30 to 70% by mass, most preferably from 40 to 70% by mass. Preferred examples of the fluorine-containing compounds are Daikin Chemical Industry's R-2020, M-2020, R-3833, M-3833, Optool DAC (all trade names), and Dai-Nippon Ink's Megafac F-171, F-172, F-179A, Defensor MCF-300, MCF-323 (all trade names), to which, however, the invention should not be limited.

The polysiloxane-base fluorine-containing compound or the polysiloxane structure-having compound may be added to the layer preferably in an amount of from 0.1 to 10% by mass of the overall solid content of the low-refractivity layer, more preferably from 1 to 5% by mass.

(High-Refractivity Layer, Middle-Refractivity Layer)

In the antireflection film of the invention, a high-refractivity layer may be provided between the antiglare layer or the diffusive layer and the low-refractivity layer on the side opposite to the side of the transparent support to thereby enhance the antireflection property of the film owing to the optical interface with the low-refractivity layer. Further, between the antiglare layer or the diffusive layer and the high-refractivity layer, a middle-refractivity layer is also preferably provided having a middle refractive index between the refractive index of the antiglare layer or the diffusive layer and that of the high-refractivity layer.

In this description, the high-refractivity layer and the middle-refractivity layer may be referred to as a generic term of high-refractivity layer. In this description, the expressions "high", "middle" and "low" of the high-refractivity layer, the middle-refractivity layer and the low-refractivity layer indicate the relative relationship of the level of the refractivity of the constitutive layers. With reference to the relation to a transparent support, the refractivity preferably satisfies the requirement of transparent support>low-refractivity layer, and high-refractivity layer>transparent support.

In this description, the high-refractivity layer, the middle-refractivity layer and the low-refractivity layer may be referred to as a generic term of antireflection layer.

In case where the low-refractivity layer is formed on the high-refractivity layer to constitute the antireflection film, the refractive index of the high-refractivity layer is preferably from 1.55 to 2.40, more preferably from 1.60 to 2.20, even more preferably from 1.60 to 2.00.

In case where the middle-refractivity layer, the high-refractivity layer and the low-refractivity layer are formed on a support in that order from the support to thereby construct the antireflection film, the refractive index of the high-refractivity layer is preferably from 1.65 to 2.40, more preferably from 1.70 to 2.20. The refractive index of the middle-refractivity layer is so controlled that it could be between the refractive index of the low-refractivity layer and the refractive index of the high-refractivity layer. Preferably, the refractive index of the middle-refractivity layer is from 1.55 to 1.80, more preferably from 1.55 to 1.70.

As specific examples of the inorganic particles to be used in the high-refractivity layer and the middle-refractivity layer, preferred are inorganic particles comprising, as the main ingredient thereof, an inorganic oxide of $TiO_2$, $ZrO_2$, $Al_2O_3$, $In_2O_3$, $ZnO$, $SnO_2$, $Sb_2O_3$, ITO or the like. For refractivity control, inorganic particles comprising $SiO_2$ as the main ingredient thereof may be added to the layer. For use in the high-refractivity layer, especially preferred are $TiO_2$ and $ZrO_2$ from the viewpoint of increasing the refractivity of the layer. Preferably, the inorganic filler may be surface-processed for silane coupling treatment or titanium coupling treatment, for which, for example, preferably employed is a surface-treating agent having a functional group capable of reacting with a binder on the filler surface.

Preferably, the content of the inorganic particles in the high-refractivity layer is from 10 to 90% by mass of the high-refractivity layer, more preferably from 15 to 80% by mass, even more preferably from 15 to 75% by mass. Two or more different types of inorganic particles may be in the high-refractivity layer as combined therein.

In case where the low-refractivity layer is formed on the high-refractivity layer, preferably, the refractive index of the high-refractivity layer is higher than the refractive index of the transparent support.

(Antistatic Layer)

The antireflection film of the invention may have an antistatic layer. In case where a fluorine-containing curable composition, especially a fluorine-containing antifouling agent is used in the invention, the film may have a low refractive index and may exhibit an excellent antifouling property; however, fluorine may align in the surface of the coating layer and therefore the film may electrostatically charge and its dusting resistance may worsen. Accordingly, the film of the invention preferably has an antistatic layer from the viewpoint of static charge prevention on the surface thereof.

The material for use in the antistatic layer and the property of the antistatic layer are described below.

For forming the antistatic layer, there are mentioned various known methods of, for example, a method of coating with a conductive coating liquid containing conductive fine particles and a reactive curable resin; a method of coating with a transparent conductive material comprising a transparent conductive polymer; a method of forming a conductive thin film through vapor deposition or sputtering with a transparent film-forming metal or metal oxide, etc. The antistatic layer may be formed on the transparent support directly or via a primer layer that enhances the adhesion of the layer to the transparent support. In case where the antistatic layer is provided as a layer near to the outermost layer of the antireflection film, the layer may exhibit a sufficient antistatic capability even though it is thin, and therefore this embodiment is preferable. In the invention, preferably, at least one thin layer, or a layer positioned between the transparent support and the thin layer nearest to the transparent support is the antistatic layer. The coating method is not specifically defined. Depending on the property of the coating layer and the coating amount thereof, the best method may be selected from known methods of, for example, a roll coating method, a gravure coating method, a bar coating method, an extrusion coating methods etc.

Preferably, the surface resistivity (SR) of the antistatic layer satisfies the following formula (3):

$$\text{LogSR} \leq 12 \tag{3}.$$

LogSR is more preferably from 5 to 12, even more preferably from 5 to 9, most preferably from 5 to 8. The surface resistivity (SR) of the antistatic layer may be measured according to a four-probe method or a circular electrode method.

Preferably, the antistatic layer is substantially transparent. Concretely, the haze of the antistatic layer is preferably at most 10%, more preferably at most 5%, even more preferably at most 3%, most preferably at most 1%. Also preferably, the light transmittance at a wavelength of 550 nm of the layer is at least 50%, more preferably at least 60%, even more preferably at least 65%, most preferably at least 70%.

[Conductive Inorganic Fine Particles for Antistatic Layer]

The antistatic layer may be formed of a coating composition prepared by dissolving conductive fine particles and a reactive curable resin in a solvent. In this, preferably, the conductive inorganic fine particles are formed of a metal oxide or nitride. Examples of the metal oxide or nitride include tin oxide, indium oxide, zinc oxide and titanium oxide. Tin oxide and indium oxide are especially preferred. The conductive inorganic fine particles may comprise, as the main ingredient thereof, such a metal oxide or nitride, and may additionally contain any other element. The main ingredient means the ingredient of which the content (% by mass) is the largest of all the ingredients constituting the grains. Examples of the other elements include Ti, Zr, Sn, Sb, Cu, Fe, Mn, Pb, Cd, As, Cr, Hg, Zn, Al, Mg, Si, P, S, B, Nb, In, V and halogen atom. For increasing the conductivity of tin oxide and indium oxide, preferred is addition thereto of at least any one selected from Sb, P, B, N, In, V and halogen atom. More concretely mentioned are combinations of one or more metal oxides selected from a group consisting of tin-doped indium oxide (ITO), antimony-doped tin oxide (ATO), fluorine-doped tin oxide (FTO), phosphorus-doped tin oxide (PTO), zinc antimonate (AZO), indium-doped zinc oxide (IZO), zinc oxide, ruthenium oxide, rhenium oxide, silver oxide, nickel oxide and copper oxide. Especially preferred are tin-doped indium oxide (ITO), antimony-doped tin oxide (ATO), phosphorus-doped tin oxide (PTO). Preferably, the proportion of Sb in ATO is from 3 to 20% by mass. Preferably, the proportion of In in ITO is from 5 to 20% by mass.

The mean particle size of the primary particles of the conductive inorganic fine particles for use in the antistatic layer is preferably from 1 to 150 nm, more preferably from 5 to 100 nm, most preferably from 5 to 70 nm. The mean particle size of the conductive inorganic fine particles in the formed antistatic layer may be from 1 to 200 nm, preferably from 5 to 150 nm, more preferably from 10 to 100 nm, most preferably from 10 to 80 nm. The mean particle size of the conductive inorganic fine particles is the mean diameter of the particles of which the mass is taken as the weight thereof, and can be determined according to a light scattering method or on an electronic microscopic photograph.

The conductive inorganic fine particles may be surface-treated. The surface treatment may be attained with an inorganic compound or an organic compound. Examples of the inorganic compound for use in the surface treatment include alumina and silica. Especially preferred is treatment with silica. Examples of the organic compound for use in the surface treatment include polyols, alkanolamines, stearic acid, silane coupling agents and titanate coupling agents. Most preferred is silane coupling agents. Concretely, the method described in JP-A 2006-259703, paragraphs [0044] to [0077]} is preferred. Also preferred is the method described in JP-A 2008-31327, paragraphs [0101] to [0122]. Two or more different modes of surface treatment may be combined for use in the invention.

Regarding the morphology thereof, the conductive inorganic fine particles are preferably grain-like, spherical, cubic, spindle-shaped or amorphous.

Two or more different types of conductive inorganic fine particles may be combined to be in the antistatic layer.

The proportion of the conductive inorganic fine particles in the antistatic layer is preferably from 20 to 90% by mass of the total solid content of the layer, more preferably from 25 to 85% by mass, most preferably from 30 to 80% by mass.

The conductive inorganic fine particles are used in the form of a dispersion thereof in forming the antistatic layer. The dispersion medium for the conductive inorganic fine particles is preferably a liquid having a boiling point of from 60 to 170° C. Examples of the dispersion medium include water, alcohols (e.g., methanol, ethanol, isopropanol, butanol, benzyl alcohol), ketones (e.g., acetone, methyl ethyl ketone, methyl isobutyl ketone, cyclohexanone), esters (e.g., methyl acetate, ethyl acetate, propyl acetate, butyl acetate, methyl formate, ethyl formate, propyl formate, butyl formate), aliphatic hydrocarbons (e.g., hexane, cyclohexane), halogenohydrocarbons (e.g., methylene chloride, chloroform, carbon tetrachloride), aromatic hydrocarbons (e.g., benzene, toluene, xylene), amides (e.g., dimethylformamide, dimethylacetamide, n-methylpyrrolidone), ethers (e.g., diethyl ether, dioxane, tetrahydrofuran), ethyl alcohols (e.g., 1-methoxy-2-propanol). Especially preferred are toluene, xylene, methyl ethyl ketone, methyl isobutyl ketone, cyclohexanone and butanol. The conductive inorganic fine particles may be dispersed in the medium with a disperser. Examples of the disperser include sand grinder mill (e.g., pinned bead mill), high-speed impeller mill, pebble mill, roller mill, attritor and colloid mill. Especially preferred is sand grinder mill and high-speed impeller mill. If desired, the particles may be processed for pre-dispersion treatment. Examples of the disperser for pre-dispersion treatment include ball mill, three-roll mill, kneader and extruder.

Preferably, the conductive inorganic compound particles are reacted with an alkoxysilane compound in an organic solvent. The reaction liquid prepared by previously reacting the conductive inorganic compound particles with an alkoxysilane compound is preferred, as excellent in the storage stability and the curability.

Powders of the conductive inorganic oxide particles are commercially available, including, for example, Mitsubishi Material's trade name T-1 (ITO), Mitsui Kinzoku's trade name, Pastolan (ITO, ATO), Ishihara Sangyo's trade name, SN-100P (ATO), CI Chemical's trade name Nanotec ITO, Nissan Chemical Industry's trade name, ATO, FTO, etc.

Preferably, the conductive inorganic oxide particles are those having silicon oxide on their surfaces, as capable of more effectively reacting with an alkoxysilane compound. A method of making the particles carry silicon oxide is described, for example, in Japanese Patent 2858271. For example, a co-precipitate of tin oxide and antimony oxide hydrate is formed and then a silicon compound is deposited around it, and the particles are fractionated and fired.

The conductive inorganic oxide particles having silicon oxide on their surfaces are commercially available, including, for example, Ishihara Sangyo's trade name, SN-100P (ATO) and SNS-10M, FSS-10M, etc.

Dispersions of the conductive inorganic oxide particles in an organic solvent are commercially available, including, for example, Ishihara Sangyo's trade name, SNS-10M (antimony-doped tin oxide dispersed in MEK), FSS-10M (antimony-doped tin oxide dispersed in isopropyl alcohol), Nissan Chemical Industry's trade name Celnax CX-Z401 (zinc antimonate dispersed in methanol), Celnax CX-Z200IP (zinc antimonate dispersed in isopropyl alcohol), Shokubai Kasei Kogyo's trade name Elcom JX-100-PTV (phosphorus-containing tin oxide dispersed in propylene glycol monomethyl ether), etc.

[Organic Solvent]

The organic solvent for use in the curable composition for forming antistatic layer may be used also as a dispersant for dispersing the conductive inorganic oxide particles, as so mentioned in the above.

The amount of the organic solvent to be mixed is preferably from 20 to 4,000 parts by mass relative to 100 parts by mass of the conductive inorganic oxide particles, more preferably from 100 to 1,000 parts by mass. When the solvent amount is less than 20 parts by mass, then the viscosity may be high and uniform reaction may be difficult; but when more than 4,000 parts by mass, then the coatability may worsen.

The organic solvent is, for example, a solvent having a boiling point under normal pressure of not higher than 200° C. Concretely, it includes alcohols, ketones, ethers, esters, hydrocarbons, amides. One or more of these may be used either singly or as combined. Above all, preferred are alcohols, ketones, ethers and esters.

The alcohols include, for example, methanol, ethanol, isopropyl alcohol, isobutanol, n-butanol, tert-butanol, ethoxyethanol, butoxyethanol, diethylene glycol monoethyl ether, benzyl alcohol, phenethyl alcohol, etc. The ketones include, for example, acetone, methyl ethyl ketone, methyl isobutyl ketone, cyclohexanone, etc. The ethers include, for example, dibutyl ether, propylene glycol monoethyl ether acetate, etc. The esters include, for example, ethyl acetate, butyl acetate, ethyl lactate, etc. The hydrocarbons include, for example, toluene, xylene, etc. The amides include, for example, formamide, dimethylacetamide, N-methylpyrrolidone, etc.

Above all, preferred are isopropyl alcohol, ethoxyethanol, butoxyethanol, diethylene glycol monoethyl ether, methyl ethyl ketone, methyl isobutyl ketone, cyclohexanone, propylene glycol monoethyl ether acetate, butyl acetate, ethyl acetate, etc.

[Binder in Antistatic Layer]

As the binder in the antistatic layer, preferred is a curable resin used in the high-refractivity layer, more preferably an ionizing radiation-curable polyfunctional monomer or polyfunctional oligomer. Also usable as the binder is a crosslinked polymer prepared by reacting a reactive curable resin. Preferably, the crosslinked polymer has an anionic group.

The crosslinked, anionic group-having polymer has a structure in which the main chain of the anionic group-having polymer is crosslinked. The anionic group has the function of maintaining the dispersion condition of the conductive inorganic fine particles. The crosslinked structure has the function of imparting a film-forming capability to the polymer to thereby reinforce the antistatic layer.

Examples of the polymer main chain include polyolefin (saturated hydrocarbon), polyether, polyurea, polyurethane, polyester, polyamine, polyamide and melamine resin. Preferred are a polyolefin main chain, a polyether main chain and a polyurea main chain; more preferred is a polyolefin main chain and a polyether main chain; and most preferred is a polyolefin main chain.

The polyolefin main chain comprises a saturated hydrocarbon. The polyolefin main chain is formed, for example, through addition polymerization of an unsaturated polymerizing group. The polyether main chain comprises repetitive units bonding to each other via an ether bond (—O—). The polyether main chain is formed, for example, through ring-opening polymerization of an epoxy group. The polyurea main chain comprises repetitive units bonding to each other via an urea bond (—NH—CO—NH—). The polyurea main chain is formed, for example, through polycondensation of an isocyanate group and an amino group. The polyurethane main chain comprises repetitive units bonding to each other via an urethane bond (—NH—CO—O—). The polyurethane main chain is formed, for example, through polycondensation of an isocyanate group and a hydroxyl group (including an N-methylol group). The polyester main chain comprises repetitive units bonding to each other via an ester bond (—CO—O—). The polyester main chain is formed, for example, through polycondensation of a carboxyl group (including an acid halide group) and a hydroxyl group (including an N-methylol group). The polyamine main chain comprises repetitive units bonding to each other via an imino bond (—NH—). The polyamine main chain is formed, for example, through ring-opening polymerization of an ethyleneimine group. The polyamide main chain comprises repetitive units bonding to each other via an amide bond (—NH—CO—). The polyamide main chain is formed, for example, through reaction of an isocyanate group and a carboxyl group (including an acid halide group). The melamine resin main chain is formed, for example, through polycondensation of a triazine group (e.g., melamine) and an aldehyde (e.g., formaldehyde). The melamine resin has a crosslinked structure in the main chain thereof.

The anionic group is directly bonded to the main chain of the polymer, or is bonded to the main chain via a linking group. Preferably, the anionic group is bonded to the main chain via a linking group, as a side branch thereto.

Examples of the anionic group include a carboxylic acid group (carboxyl), a sulfonic acid group (sulfo) and a phosphoric acid group (phosphono), etc. Preferred are a sulfonic acid group and a phosphoric acid group.

The anionic group may be in the form of a salt. The cation to from a salt with the anionic group is preferably an alkali metal ion. The proton of the anionic group may be dissociated.

The linking group to link the anionic group to the polymer main chain is preferably a divalent group selected from —CO—, —C—, an alkylene group, an arylene group and their combinations.

The crosslinked structure chemically bonds at least two main chains (preferably in a mode of covalent bonding). Preferably, the crosslinked structure bonds at least three main chains in a mode of covalent bonding. Preferably, the crosslinked structure comprises a divalent or more polyvalent group selected from —CO—, —O—, —S—, a nitrogen atom, a phosphorus atom, an aliphatic residue, an aromatic residue and their combinations.

The crosslinked, anionic group-having polymer is preferably a copolymer comprising anionic group-having repetitive units and crosslinked structure-having repetitive units. Preferably, the proportion of the anionic group-having repetitive units in the copolymer is from 2 to 96% by mass, more preferably from 4 to 94% by mass, most preferably from 6 to 92% by mass. The repetitive unit may have two or more anionic groups. The proportion of the crosslinked structure-having repetitive units in the copolymer is preferably from 4 to 98% by mass, more preferably from 6 to 96% by mass, most from 8 to 94% by mass.

The repetitive units of the crosslinked, anionic group-having polymer may have both an anionic group and a crosslinked structure. They may include any other repetitive units (repetitive units having neither an anionic group nor a crosslinked structure).

As the other repetitive units, preferred are repetitive units having an amino group or a quaternary ammonium group, and repetitive units having a benzene ring. The amino group or the quaternary ammonium group has the function of maintaining the dispersion condition of inorganic fine particles, like the anionic group. The amino group, the quaternary ammonium group and the benzene ring may exhibit the same effect when they are in the anionic group-having repetitive units or the crosslinked structure-having repetitive units.

In repetitive units having an amino group or a quaternary ammonium group, the amino group or the quaternary ammonium group directly bonds to the polymer main chain or bonds to the main chain via a linking group. Preferably, the amino group or the quaternary ammonium group bonds to the main chain via a linking group, as a side branch thereto. The amino group or the quaternary ammonium group is preferably a secondary amino group, a tertiary amino group or a quaternary ammonium group, more preferably a tertiary amino group or a quaternary ammonium group. The group bonding to the nitrogen atom of the secondary amino group, the tertiary amino group or the quaternary ammonium group is preferably an alkyl group, more preferably an alkyl group having from 1 to 12 carbon atoms, even more preferably an alkyl group having from 1 to 6 carbon atoms. The counter ion of the quaternary ammonium group is preferably a halide ion. The linking group that links the amino group or the quaternary ammonium group to the polymer main chain is preferably a divalent group selected from —CO—, —NH—, —O—, an alkylene group, an arylene group, and their combinations. In case where the crosslinked, anionic group-having polymer contains the repetitive units having an amino group or a quaternary ammonium group, the proportion of the repetitive units in the polymer is preferably from 0.06 to 32% by mass, more preferably from 0.08 to 30% by mass, most preferably from 0.1 to 28% by mass.

The binder may be combined with a reactive organic silicon compound, for example, as in JP-A 2003-39586. The reactive organic silicon compound may be used in an amount of from 10 to 70% by mass relative to the above binder, ionizing radiation-curable resin. The reactive organic silicon compound is preferably an organosilane compound. The compound may be the resin ingredient by itself to form the antistatic layer.

The integrated reflectivity of the antireflection film having a low-refractivity layer of the invention is preferably at most 3.5%, more preferably at most 3.0%, even more preferably at most 2.0%, most preferably from 0.3% to 2.0%. By reducing the integrated reflectivity thereof, the antireflection film can have a sufficient antiglare property even though the light scattering on the surface of the film is reduced, and therefore, the antireflection film may attain good denseness of black in displays.

As the transparent support of the antireflection film of the invention, preferred is a plastic film. The polymer to form the plastic film includes cellulose acylates (e.g., triacetyl cellulose, diacetyl cellulose, typically FUJIFILM's TAC-TD80U, TD80UF), polyamides, polycarbonates, polyesters (e.g., polyethylene terephthalate, polyethylene naphthalate), polystyrenes, polyolefins, norbonene resins (Arton, trade name by JSR), amorphous polyolefins (Zeonex, trade name by Nippon Zeon), (meth)acrylic resins (Acrypet VRL20A, trade name by Mitsubishi Rayon; cyclic structure-having acrylic resins as in JP-A 2004-70296, 2006-171464), etc. Of those, preferred are triacetyl cellulose, polyethylene terephthalate, polyethylene naphthalate; and more preferred is triacetyl cellulose.

In case where the antireflection film of the invention is used in a liquid-crystal display device, and adhesive layer is formed on one surface of the film, and the film is disposed on the outermost surface of the display. The antireflection film of the invention may be combined with a polarizing plate. In case where the transparent support of the antireflection film of the invention is formed of a triacetyl cellulose, the triacetyl cellulose support may serve as a protective film for protecting the polarizing layer of the polarizing plate, and therefore, it is desirable that the antireflection film of the invention is used as the protective film directly as it is from the viewpoint of the production cost of the polarizing plate.

In case where the antireflection film of the invention is disposed on the outermost surface of a display after an adhesive layer is provided on one surface of the film, or where the antireflection film is used as a protective film for a polarizing plate directly as it is, it is desirable an outermost layer is formed on the transparent support and this is saponified for sufficiently adhering the film. The saponification may be attained in any known method of, for example, dipping the film in an alkali liquid for a suitable period of time. After dipped in an alkali liquid, it is desirable that the film is fully washed with water or is dipped in a dilute acid to neutralize the alkali ingredient, so that the alkali ingredient may not remain in the film. Through the saponification, the surface of the support on the side opposite to the side having the outermost layer is hydrophilicated.

[Surface Condition]

In case where the antireflection film of the invention is used in a liquid-crystal display device, it is desirable that the film satisfies both good antiglare property and good denseness of black in displays. Regarding the antiglare property, various types of light from various light sources may reflect on the film in practical use, and therefore, the film must have a good antiglare property. As a result of the present inventors' earnest studies, it has been found that the various types of light reflection on a display panel can be evaluated in a simplified manner by changing the reflection angle of light from light sources. A display panel must satisfy good reflection resistance both to a large-size light source (for example, fluorescent lamp) and to a thin light source (for example, simulated linear light source by masking a fluorescent lamp with a cover). Regarding the denseness of light in displays, the display panel must satisfy a good denseness of black both in a case of watching the display in a vertical direction thereto in a light room environment and in a case of watching the display in a direction at an angle of 45 degrees. A preferred surface condition (surface unevenness) of the antireflection film of the invention to attain both the excellent antiglare property and the excellent denseness of black as evaluated based on the indices as above is described below.

Regarding the surface unevenness profile thereof, preferably, the antireflection film of the invention has a center line average roughness Ra of from 0.05 to 0.25 μm, more preferably from 0.10 to 0.20 μm. When Ra is too large, the denseness of black and the light room contrast in displays may worsen; and when Ra is too small, the antiglare property of the film may be poor. Especially preferably, the 10-point average roughness Rz of the film is at most 10 times of Ra.

For attaining the surface condition favorable for both the antiglare property and the denseness of black in displays, the mean mountain-to-valley distance Sm is also an important factor. Sm of the film is preferably from 60 to 150 μm, more preferably from 60 to 140 μm, even more preferably from 70 to 140 μm. When Sm is too large, then the surface roughness may be great and the outward appearance of the film may be poor, and in addition, the light from a large-size light source may often reflect on the display panel. When Sm is too small, then the denseness of black in displays may worsen and the edge blur from a fine light source (linear light source) may be weak unfavorably.

For bettering the light room contrast, the mean tile angle must be controlled to fall within a specific range. The mean tilt angle is preferably from 0.5 degrees to 3.0 degrees, more preferably from 0.7 degrees to 2.0 degrees. When the mean tilt angle is too large, then the denseness of black may worsen and the edge blur from a fine light source (linear light source) may be weak unfavorably. When the mean tilt angle is too small, then the light from a large-size light source may often reflect on the display panel unfavorably.

For attaining the object of the invention, that is, the excellent antiglare property and the good denseness of black, the maximum value of the tilt angle distribution (θp) is also an extremely important factor. θp is preferably from 0.05° to 0.50°, more preferably from 0.05° to 0.30°. When θp is too small, then the light from a large-size light source may often reflect on the display panel unfavorably; and when too large, the denseness of black may worsen and, in addition, the edge blur from a fine light source (linear light source) may be weak unfavorably.

The mean tilt angle of the antireflection film of the invention may be determined according to the method mentioned below. Briefly, vertexes of a triangle having an area of from 0.5 to 2 square micrometers are supposed on a transparent film substrate, and normal lines are extended vertically and upwardly from the vertexes (three lines normal to the substrate). A triangle is formed by connecting three points at which these three lines normal to the substrate intersect with the film surface. Then, an angle between a line normal to the triangle thus-formed and a normal line extended vertically and upwardly from the substrate surface is defined as a tilt angle. An area of at least 250,000 square micrometers (0.25 square millimeters) on the substrate is divided into the above-mentioned triangles and the tilt angle measurement is made on every triangle. All the data are averaged to give the mean tile angle.

Figure 1B:
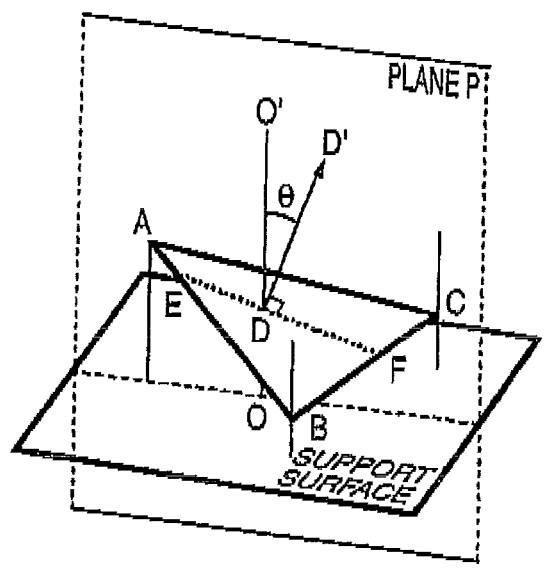
Figure 1C:
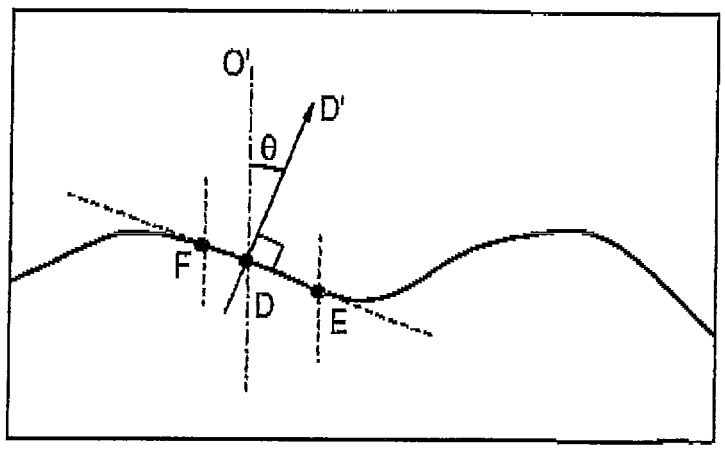

The method of measuring the tilt angle is described below in more detail. As shown in FIG. 1A, the substrate surface of the sample is partitioned into meshes having areas of 0.5 to 2 square micrometers. FIG. 1 is a diagram showing three points of one triangle constituting the partitioned mesh. From these three points on the substrate, normal lines are extended vertically and upwardly. Three points at which these normal lines intersect with the film surface are indicated by letters A, B and C. The angle θ which the normal line DD' to the plane of the triangle ABC forms with the normal line OO' extending vertically and upwardly from the substrate is defined as the tilt angle. FIG. 1C is a cross-sectional diagram of the film cut through at the plane P in which the points O', D and D' lie. The segment EF is an intersection line of the triangle ABC and the plane P. In the invention, the suitable area to be measured on the substrate is preferably at least 250,000 square micrometers (0.25 square millimeters). This area is divided into triangles on the support, and the tilt angle is determined. There are several devices usable for these measurements, and one example is described, in which Model SXM520-AS150 made by Micromap Corporation (USA) is used. For example, when the object lens has a power of 10 times, the measurement unit of the tilt angle is 0.8 square micrometers, and the measurement range is 500,000 square micrometers (0.5 square millimeters). Potentially, by increasing the power of the objective lens, the measurement unit and the area to be measured may be decreased accordingly. Data obtained from those measurements are analyzed by the use of a software program, such as MAT-LAB or the like, and the distribution of tilt angles can be calculated; and based on the data, the mean tile angle can be computed.

[Optical Properties]

The haze (hereinafter this may be referred to as surface haze), as caused by surface scattering, of the antireflection film of the invention is preferably from 0.2% to 10%, more preferably from 0.2% to 5%. When the surface haze is too large, then the denseness of black may worsen; but when too small, the antiglare property may worsen.

The haze (hereinafter this may be referred to as internal haze), as caused by internal scattering, of the antireflection film of the invention is preferably from 1% to 40%, more preferably from 5% to 30%, even more preferably from 10% to 25%. When the internal haze is too large, then the front contrast may lower and the panel looks much yellowed. When too small, the latitude in combining the materials to be used is narrow, and it may be difficult to better the antiglare property of the film and to control the characteristic values thereof, and there may be another problem in that the production cost is high.

The surface haze and the internal haze may be determined according to the process mentioned below.

(1) The total haze value (H) of the film is measured according to JIS-K7136.

(2) A few drops of silicon oil are applied to the surface on the side of the low-refractivity region of the film and to the back thereof, and sandwiched between two sheets of glass (microslide glass Code No. S 9111, by Matsunami) each having a thickness of 1 mm, and the two glass sheets and the film are kept in optically airtight contact with each other and the surface haze is thus removed. In this condition, the haze of the film is measured. On the other hand, silicon oil alone is sandwiched between two sheets of glass, and the haze is measured. The value computed by subtracting the latter from the former is the internals haze (Hi) of the film.

(3) From the total haze (H) measured in the above (1), the internal haze (Hi) computed in the above (2) is subtracted to give the surface haze (Hs) of the film.

The antireflection film of the invention is such that the image sharpness through it, as measured in an optical comb width of 0.5 mm according to JIS K7105, is preferably from 30% to 99%, more preferably from 40% to 95% even more preferably from 50% to 90%, still more preferably from 60% to 80%. When the image sharpness is low, the light room contrast may lower; but when it is high, the antiglare property of the film may worsen.

[Coating Method]

The antireflection film of the invention may be produced according to the method mentioned below, to which, however, the invention should not be limited.

First, coating liquids containing the constitutive ingredients for the constitutive layers are prepared. Next, the coating liquids for forming functional layers are applied onto a transparent support according to a dip coating method, an air knife coating method, a curtain coating method, a roller coating method, a wire bar coating method, a gravure coating method or a die coating methods and then heated and dried thereon. Preferred are a microgravure coating method, a wire bar coating method, or a die coating method (see U.S. Pat. No. 2,681,294, JP-A 2006-122889); and more preferred is a die coating method.

Next, through irradiation with light or by heating, the monomers to form an antiglare layer or a diffusive layer and other optional functional layers are polymerized and cured. Accordingly, the intended layers are formed. If desired, plural functional layers may be formed.

Next, in the same manner as above, a coating liquid for forming a low-refractivity layer is applied onto the antiglare layer or the diffusive layer or any other optional layer, then irradiated with light or heated (for example, irradiated with ionizing radiations such as UV rays, preferably with such ionizing radiations under heat) and cured to form the intended low-refractivity layer. According to the process, the antireflection film of the invention is produced.

[Protective Film, Polarizing Plate]

A polarizing plate mainly comprises a polarizing film and two protective films for protecting both the surface and the back of the polarizing film. Preferably, the antireflection film of the invention is used as at least one of the two protective films that sandwich the polarizing film on both surfaces thereof. As the antireflection film of the invention serves as the protective film, the production cost of the polarizing plate may be reduced. When the antireflection film of the invention is sued as the outermost layer of a polarizing plate, then the polarizing plate may have excellent scratch resistance and fouling resistance.

The surface of the antireflection film of the invention is hydrophilicated, and then stuck to a polarizer using polyvinyl alcohol as an adhesive, thereby giving a polarizing plate. For the hydrophilication treatment preferred is saponification. The hydrophilicated surface is especially effective as having enhanced adhesiveness to the polarizing film that comprises polyvinyl alcohol as the main ingredient thereof. In addition, dust in air hardly adheres to the hydrophilicated surface, and therefore, when the antireflection film is stuck to a polarizing film, they are hardly contaminated with dust in the interface between them. Accordingly, the hydrophilication treatment is effective for preventing dot defects to be caused by dust in polarizing plates.

Preferably, the saponification treatment is attained in such a manner that the contact angle to a water drop on the surface of the transparent support on the side opposite to the side thereof having the outermost layer is at most 40°, more preferably at most 30°, even more preferably at most 20°.

[Image Display Device]

The antireflection film of the invention is applicable to image display devices such as liquid-crystal display devices (LCD), plasma display panels (PDP), electroluminescent displays (ELD), cathode ray tube display devices (CRT), surface emission displays (SED), etc. Especially preferably, the film is used in liquid-crystal display devices (LCD). Since the antireflection film of the invention has a transparent support, the side of the transparent support of the film may be stuck to the image display panel side of an image display device. In case where the film is used in a liquid-crystal display device, the film is first worked into a polarizing plate, as described in the above, and then the polarizing plate may be stuck to the surface of a liquid-crystal cell in such a manner that the antireflection film of the invention can be the outermost surface of the device.

When the antireflection film of the invention is used as one surface protective film of a polarizing film, it is favorably used in transmission-type, reflection-type or semitransmission-type liquid-crystal display devices of various modes of twisted nematic (TN), super-twisted nematic (STN), vertical alignment (VA), in-plane switching (IPS) or optically compensated bend cell (OCB) modes.

EXAMPLES

The invention is described in more detail with reference to the following Examples, to which, however, the invention should not be limited. Unless otherwise specifically indicated, "part" and "%" are all by mass.

| Composition of Coating Liquid A-1 for antiglare layer: | |
|---|---|
| PET-30 | 44.0 g |
| DPCA-20 | 44.0 g |
| Irgacure 127 | 3.0 g |
| 6 μm-crosslinked acryl/styrene particles A dispersion (30%) | 26.4 g |
| SP-13 | 0.2 g |
| MIBK | 22.0 g |
| MEK | 40.4 g |

After the above coating liquid is cured, the antiglare layer or diffusive layer excluding resin particles has a refractive index of 1.50.

| Composition of Coating Liquid A-2 for antiglare layer: | |
|---|---|
| PET-30 | 44.0 g |
| Biscoat 360 | 44.0 g |
| Irgacure 127 | 3.0 g |
| 6 μm-crosslinked acryl/styrene particles A dispersion (30%) | 26.4 g |
| 6 μm-crosslinked acryl particles G dispersion (30%) | 9.9 g |
| SP-13 | 0.2 g |
| MIBK | 16.1 g |
| MEK | 40.4 g |
| Composition of Coating Liquid A-3 for antiglare layer: | |
| PET-30 | 44.0 g |
| Biscoat 360 | 44.0 g |
| Irgacure 127 | 3.0 g |
| 3.5 μm-crosslinked acryl/styrene particles B dispersion (30%) | 26.4 g |
| SP-13 | 0.2 g |
| MIBK | 22.0 g |
| MEK | 40.4 g |
| Composition of Coating Liquid A-4 for antiglare layer: | |
| PET-30 | 44.0 g |
| Biscoat 360 | 44.0 g |
| Irgacure 127 | 3.0 g |
| 5 μm-crosslinked acryl/styrene particles C dispersion (30%) | 26.4 g |
| SP-13 | 0.2 g |
| MIBK | 22.0 g |
| MEK | 40.4 g |
| Composition of Coating Liquid A-5 for antiglare layer: | |
| PET-30 | 44.0 g |
| Biscoat 360 | 44.0 g |
| Irgacure 127 | 3.0 g |
| 6 μm-crosslinked acryl/styrene particles A dispersion (30%) | 26.4 g |
| SP-13 | 0.2 g |
| MIBK | 22.0 g |
| MEK | 40.4 g |
| Composition of Coating Liquid A-6 for antiglare layer: | |
| PET-30 | 44.0 g |
| Biscoat 360 | 44.0 g |
| Irgacure 127 | 3.0 g |
| 14 μm-crosslinked acryl/styrene particles D dispersion (30%) | 26.4 g |
| SP-13 | 0.2 g |
| MIBK | 22.0 g |
| MEK | 40.4 g |
| Composition of Coating Liquid A-7 for antiglare layer: | |
| PET-30 | 44.0 g |
| Biscoat 360 | 44.0 g |
| Irgacure 127 | 3.0 g |
| 6 μm-crosslinked acryl/styrene particles A dispersion (30%) | 26.4 g |
| 8 μm-crosslinked acryl particles H dispersion (30%) | 9.9 g |
| SP-13 | 0.2 g |
| MIBK | 16.1 g |
| MEK | 40.4 g |
| Composition of Coating Liquid A-8 for antiglare layer: | |
| PET-30 | 44.0 g |
| Biscoat 360 | 44.0 g |
| Irgacure 127 | 3.0 g |
| 6 μm-crosslinked acryl/styrene particles A dispersion (30%) | 26.4 g |
| 6 μm-crosslinked acryl/styrene particles J dispersion (30%) | 9.9 g |
| SP-13 | 0.2 g |
| MIBK | 16.1 g |
| MEK | 40.4 g |
| Composition of Coating Liquid A-9 for antiglare layer: | |
| PET-30 | 44.0 g |
| Biscoat 360 | 44.0 g |
| Irgacure 127 | 3.0 g |
| 6 μm-crosslinked acryl/styrene particles A dispersion (30%: hexane) | 26.4 g |
| 6 μm-crosslinked acryl particles G dispersion (30%: hexane) | 9.9 g |
| SP-13 | 0.2 g |
| MIBK | 16.1 g |
| MEK | 40.4 g |
| Composition of Coating Liquid A-10 for antiglare layer: | |
| PET-30 | 44.0 g |
| Biscoat 360 | 44.0 g |
| Irgacure 127 | 3.0 g |
| 6 μm-crosslinked acryl/styrene particles A dispersion (30%) | 26.4 g |
| 6 μm-crosslinked acryl particles G dispersion (30%) | 9.9 g |
| SP-13 | 0.2 g |
| MIBK | 16.1 g |
| MEK | 40.4 g |
| Composition of Coating Liquid A-11 for antiglare layer: | |
| PET-30 | 44.0 g |
| Biscoat 360 | 44.0 g |
| Irgacure 127 | 3.0 g |
| 6 μm-crosslinked acryl/styrene particles A dispersion (30%) | 13.2 g |
| 6 μm-crosslinked acryl particles G dispersion (30%) | 9.9 g |
| SP-13 | 0.2 g |
| MIBK | 29.3 g |
| MEK | 40.4 g |

-continued

| Composition of Coating Liquid A-12 for antiglare layer: | |
|---|---|
| PET-30 | 44.0 g |
| Biscoat 360 | 44.0 g |
| Irgacure 127 | 3.0 g |
| 6 μm-crosslinked acryl/styrene particles A dispersion (30%) | 52.8 g |
| 6 μm-crosslinked acryl particles G dispersion (30%) | 9.9 g |
| SP-13 | 0.2 g |
| MIBK | 2.9 g |
| MEK | 40.4 g |

| Composition of Coating Liquid A-13 for antiglare layer: | |
|---|---|
| PET-30 | 44.0 g |
| Biscoat 360 | 44.0 g |
| Irgacure 127 | 3.0 g |
| 12 μm-crosslinked acryl/styrene particles E dispersion (30%) | 13.2 g |
| 6 μm-crosslinked acryl particles G dispersion (30%) | 9.9 g |
| SP-13 | 0.2 g |
| MIBK | 29.3 g |
| MEK | 40.4 g |

| Composition of Coating Liquid A-14 for antiglare layer: | |
|---|---|
| PET-30 | 44.0 g |
| Biscoat 360 | 44.0 g |
| Irgacure 127 | 3.0 g |
| 6 μm-crosslinked acryl/styrene particles F dispersion (30%) | 39.6 g |
| 6 μm-crosslinked acryl particles G dispersion (30%) | 9.9 g |
| SP-13 | 0.2 g |
| MIBK | 2.9 g |
| MEK | 40.4 g |

| Composition of Coating Liquid A-15 for antiglare layer: | |
|---|---|
| PET-30 | 44.0 g |
| Biscoat 360 | 44.0 g |
| Irgacure 127 | 3.0 g |
| 6 μm-crosslinked acryl/styrene particles A dispersion (30%) | 26.4 g |
| 6 μm-crosslinked acryl particles G dispersion (30%) | 9.9 g |
| SP-13 | 0.2 g |
| MIBK | 16.1 g |
| MEK | 40.4 g |

| Composition of Coating Liquid A-16 for antiglare layer: | |
|---|---|
| PET-30 | 88.0 g |
| Irgacure 127 | 3.0 g |
| 6 μm-crosslinked acryl/styrene particles A dispersion (30%) | 26.4 g |
| SP-13 | 0.2 g |
| MIBK | 16.1 g |
| MEK | 40.4 g |

After the above coating liquid is cured, the antiglare layer or diffusive layer excluding resin particles has a refractive index of 1.52.

| Composition of Coating Liquid A-17 for antiglare layer: | |
|---|---|
| PET-30 | 44.0 g |
| Biscoat 360 | 44.0 g |
| Irgacure 127 | 3.0 g |
| 6 μm-crosslinked styrene particles I dispersion (30%) | 26.4 g |
| SP-13 | 0.2 g |
| MIBK | 16.1 g |
| MEK | 40.4 g |

The above-mentioned coating liquids for antiglare layer are individually filtered through a polypropylene filter having a pore size of 30 μm to prepare coating liquids.

After the above coating liquids except for the coating liquids A-1 and A-16 are cured, the antiglare layers or diffusive layers excluding resin particles have a refractive index of 1.51.

The dispersion of particles is prepared as follows: The particles mentioned below are gradually added to an MIBK solution with stirring until the solid concentration in the resulting dispersion could be 40% by mass, and stirred for 30 minutes. Except the particles B and I, the particles are all commercial products of Sekisui Plastics (the particles all have the content of the crosslinking monomer in an amount of at least 15% by mass [relative to all the monomers]). The particles B and I are by Soken Chemical & Engineering.

6 μm-crosslinked acryl/styrene particles A: refractive index 1.56 (acryl/styrene ratio, 3/7).

3.5 μm-crosslinked acryl particles B; refractive index 1.56 (acryl/styrene ratio, 3/7; content of crosslinking monomer, at least 15% by mass).

5 μm-crosslinked acryl/styrene particles C: refractive index 1.56 (acryl/styrene ratio, 3/7).

14 μm-crosslinked acryl/styrene particles D: refractive index 1.56 (acryl/styrene ratio, 3/7).

12 μm-crosslinked acryl/styrene particles E: refractive index 1.55 (acryl/styrene ratio, 4/6).

6 μm-crosslinked acryl/styrene particles F: refractive index 1.54 (acryl/styrene ratio, 5/5).

6 μm-crosslinked acryl particles G: refractive index 1.50.

8 μm-crosslinked acryl particles H: refractive index 1.50.

6 μm-crosslinked styrene particles I: refractive index 1.60 (content of crosslinking monomer, less than 15% by mass).

6 μm-crosslinked acryl/styrene particles J: refractive index 1.55 (acryl/styrene ratio, 4/6).

| Composition of Coating Liquid L-1 for low-refractivity layer: | |
|---|---|
| Ethylenic unsaturated group-containing fluoropolymer (A-1) | 3.9 g |
| Silica dispersion A (22%) | 25.0 g |
| Irgacure 127 | 0.2 g |
| DPHA | 0.4 g |
| MEK | 100.0 g |
| MIBK | 45.5 g |

After cured, the refractive index of the low-refractivity layer formed by coating and curing the above coating liquid is 1.36.

| Composition of Coating Liquid L-2 for low-refractivity layer: | |
|---|---|
| JTA-103 | 15.0 g |
| MEK-ST-L (30%) | 1.4 g |
| Organosilane compound A | 0.4 g |
| MEK | 3.0 g |
| Cyclohexanone | 0.6 g |

After cured, the refractive index of the low-refractivity layer formed by coating and curing the above coating liquid is 1.42.

| Composition of Coating Liquid L-3 for low-refractivity layer: | |
|---|---|
| Ethylenic unsaturated group-containing fluoropolymer (A-1) | 3.9 g |
| Silica dispersion A (22%) | 15.0 g |
| Irgacure 127 | 0.2 g |
| DPHA | 0.4 g |
| MEK | 100.0 g |
| MIBK | 45.5 g |

After cured, the refractive index of the low-refractivity layer formed by coating and curing the above coating liquid is 1.40.

Composition of Coating Liquid L-4 for low-refractivity layer:

| | |
|---|---|
| Ethylenic unsaturated group-containing fluoropolymer (A-1) | 3.9 g |
| Silica dispersion A (22%) | 25.0 g |
| Irgacure 127 | 0.2 g |
| DPHA | 2.0 g |
| MEK | 100.0 g |
| MIBK | 45.5 g |

After cured, the refractive index of the low-refractivity layer formed by coating and curing the above coating liquid is 1.40.

Composition of Coating Liquid L-5 for low-refractivity layer:

| | |
|---|---|
| Ethylenic unsaturated group-containing fluoropolymer (A-1) | 3.9 g |
| Silica dispersion B-1 (28%) | 8.5 g |
| Silica dispersion B-2 (28%) | 11.1 g |
| Irgacure 127 | 0.2 g |
| PET-30 | 0.4 g |
| MEK | 104.4 g |
| MIBK | 45.5 g |

After cured, the refractive index of the low-refractivity layer formed by coating and curing the above coating liquid is 1.45.

The above-mentioned coating liquids for low-refractivity layer are individually filtered through a polypropylene filter having a pore size of 1 μm to prepare coating liquids.

The compounds used are shown below,

PET-30: mixture of pentaerythritol triacrylate and pentaerythritol tetraacrylate (by Nippon Kayaku, average molecular weight: 298).

DPHA: mixture of dipentaerythritol pentaacrylate and dipentaerytritol hexaacxylate (by Nippon Kayaku, average molecular weight: 524,527).

DPCA-20: caprolactone-added dipentaerythritol hexaacrylate (n=2) (by Nippon Kayaku, average molecular weight: 807).

DPCA-120: caprolactone-added dipentaerythritol hexaacrylate (n=12) (by Nippon Kayaku, average molecular weight: 1,947).

Biscoat 360: trimethylolpropane EO-added triacrylate (n=3) (by Osaka Organic Chemical Industry, average molecular weight: 450.5).

Irgacure 127: polymerization initiator (by Ciba Speciality Chemicals).

Ethylenic unsaturated group-containing fluoropolymer (A-1): fluoropolymer (A-1) described in Production Example 3 in JP-A 2005-89536.

JTA-103: thermal crosslinking fluoropolymer (by JSR).

MEK-ST-L: MEK dispersion of silica fine particles (mean particle size, 45 nm; silica concentration, 30%; by Nissan Chemical Industry).

MEK-ST: MEK dispersion of silica fine particles (mean particle size, 45 nm; silica concentration, 30%; by Nissan Chemical Industry).

Organosilane compound A: organosilane compound described in Example 1 in JP-A 2007-148398.

SP-13: fluorine-containing surfactant (dissolved in MEK solvent to have a solid concentration of 40% by mass).

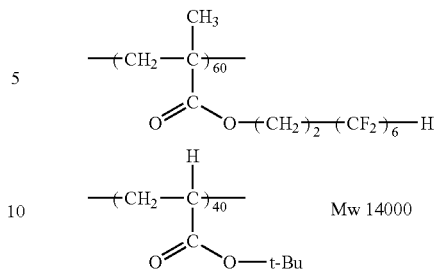

SP-13

(Silica Dispersion A)

Acryloyloxypropyltrimethoxysilane (by Shin-etsu Chemical Industry) (10 g) and diisopropoxyaluminiumethyl acetate (1.0 g) are added to hollow silica fine particle sol (isopropyl alcohol/silica sol, mean particle size 60 nm, shell thickness 10 nm, silica concentration 20% by mass, refractive index of silica particles 1.31, prepared according to Preparation Example 4 in JP-A 2002-79616 but changing the size of the particles), and mixed, and then ion-exchanged water (3 g) is added thereto. After reacted at 60° C. for 8 hours, this is cooled to room temperature, and acetylacetone (1.0 g) is added thereto. The dispersion (500 g) is processed for solvent substitution through distillation under reduced pressure with adding thereto cyclohexanone in such a manner that the silica content in the dispersion can be kept constant. No impurity forms in the dispersion. The solid concentration in the dispersion is controlled to be 22% by mass with cyclohexanone added thereto, and the viscosity of the dispersion is 5 mPa·s at 25° C. Thus obtained, the dispersion A is analyzed through gas chromatography, and the remaining isopropyl alcohol is 1.0%.

(Silica Dispersion B-1)

Acryloyloxypropyltrimethoxysilane (by Shin-etsu Chemical Industry) (10 g) and diisopropoxyaluminiumethyl acetate (1.0 g) are added to and mixed with MEK-ST-L (500 g), and ion-exchanged water (3 g) is added thereto. After reacted at 60° C. for 8 hours, this is cooled to room temperature, and acetylacetone (1.0 g) is added thereto. No impurity forms in the dispersion. As controlled to have a solid concentration of 28% by mass with methyl ethyl ketone added thereto, the dispersion has a viscosity of 1 mPa·s at 25° C.

(Silica Dispersion B-2)

Acryloyloxypropyltrimethoxysilane (by Shin-etsu Chemical Industry) (10 g) and diisopropoxyaluminiumethyl acetate (1.0 g) are added to and mixed with MEK-ST (500 g), and ion-exchanged water (3 g) is added thereto. After reacted at 60° C. for 8 hours, this is cooled to room temperature, and acetylacetone (1.0 g) is added thereto. No impurity forms in the dispersion. As controlled to have a solid concentration of 28% by mass with methyl ethyl ketone added thereto, the dispersion has a viscosity of 1.5 mPa·s at 25° C.

Example 1

(Production of Antireflection Film Sample)

A roll of triacetyl cellulose film (TAC-TD80U, by FUJIFILM) having a thickness of 80 μm is unrolled, and coated with the coating liquid for antiglare layer or diffusive layer shown in Table 1, according to a die coating method using a slot die described in Example 1 in JP-A 2006-122889, at a traveling speed of 30 m/min, then dried at 60° C. for 150 seconds, and irradiated with UV rays from an air-cooled metal halide lamp (160 W/cm, by Eyegraphics) at an illumination intensity of 400 mW/cm² and at an irradiation dose of 100 mJ/cm², under nitrogen purging to be in an atmosphere having an oxygen concentration of about 0.1%, thereby curing the coating layer, and thereafter the film is rolled up. The coating amount is so controlled that the thickness of the antiglare layer or the diffusive layer could be as in Table 1.

(Evaluation of Light-Transmissive Resin Particles)

(1) Compression Strength:

The compression strength is determined, using Shimadzu's microcompression tester MCT-W201 at 25° C. and 65% RH. The sample presser is FLAT20; the load to sample is 49.0 (mN); the loading speed is 0.710982 (mN/sec); and the displacement full scale is 5 (μm). Under the condition, particles are tested for the displacement 10% of each single particle.

From the found data, the compression strength of the particles tested is computed according to the above-mentioned formula (1).

(2) Swelling Degree:

The swelling degree is determined as follows: Resin particles are dispersed in a dispersion solvent to have a concentration of 30% by mass. The particle size ($r_1$) is measured within 3 hours after the end of dispersing the particles. The dispersion is statically kept at room temperature (25° C.) for a while, and at the equilibrium state at which the increase in the particle size has stopped, the particle size ($r_2$) is again measured. The swelling degree is computed according to the following formula:

Swelling Degree(% by volume)=$\{(r_2/r_1)^3-1\}\times 100$.

TABLE 1

| | Sample No. | Coating Liquid for antiglare layer/diffusive layer | Compression Strength (N/mm²) | Residual Monomer Content (%) | Swelling Degree (%) | Particles C | Particle Size φC (μm) | Compression Strength (N/mm²) | Residual Monomer Content (%) | Swelling Degree (%) | Particles D | Particle Size φD (μm) | Particle Refractive Index npC/npD (—) | Particle Content in Solid (wt. %) | Dispersion Solvent | Thickness t (μm) | φC/t |
|---|---|---|---|---|---|---|---|---|---|---|---|---|---|---|---|---|---|
| the Invention | 1 | A-1 | 42.9 | 0.3 | 11.7 | A | 6 | — | — | — | — | — | 1.56 | 8/0 | MiBK | 14 | 0.43 |
| the Invention | 2 | A-2 | 42.9 | 0.3 | 11.7 | A | 6 | 60.8 | 0.1 | 11 | G | 6 | 1.56/1.50 | 8/3 | MiBK | 14 | 0.43 |
| the Invention | 3 | A-3 | 42.9 | 0.3 | 11.7 | B | 3.5 | — | — | — | — | — | 1.56 | 8/0 | MiBK | 14 | 0.25 |
| the Invention | 4 | A-4 | 46.6 | 0.25 | 11.6 | C | 5 | — | — | — | — | — | 1.56 | 8/0 | MiBK | 14 | 0.36 |
| the Invention | 5 | A-5 | 42.9 | 0.3 | 11.7 | A | 6 | — | — | — | — | — | 1.56 | 8/0 | MiBK | 6 | 1.00 |
| the Invention | 6 | A-5 | 42.9 | 0.3 | 11.7 | A | 6 | — | — | — | — | — | 1.56 | 8/0 | MiBK | 17 | 0.35 |
| the Invention | 7 | A-6 | 42.9 | 0.3 | 11.7 | D | 14 | — | — | — | — | — | 1.56 | 8/0 | MiBK | 15 | 0.93 |
| the Invention | 8 | A-7 | 42.9 | 0.3 | 11.7 | A | 6 | 60.8 | 0.1 | 11 | H | 8 | 1.56/1.50 | 8/3 | MiBK | 14 | 0.43 |
| the Invention | 9 | A-8 | 42.9 | 0.3 | 11.7 | A | 6 | 46.6 | 0.25 | 11.6 | J | 6 | 1.56/1.56 | 8/3 | MiBK | 14 | 0.43 |
| the Invention | 10 | A-9 | 42.9 | 0.3 | 11.7 | A | 6 | 60.8 | 0.1 | 23 | G | 6 | 1.56/1.50 | 8/3 | hexane | 14 | 0.43 |
| the Invention | 11 | A-10 | 42.9 | 0.3 | 11.7 | A | 6 | 60.8 | 0.1 | 11 | G | 6 | 1.56/1.50 | 8/3 | MiBK | 14 | 0.43 |
| the Invention | 12 | A-10 | 42.9 | 0.3 | 11.7 | A | 6 | 60.8 | 0.1 | 11 | G | 6 | 1.56/1.50 | 8/3 | MiBK | 14 | 0.43 |
| the Invention | 13 | A-10 | 42.9 | 0.3 | 11.7 | A | 6 | 60.8 | 0.1 | 11 | G | 6 | 1.56/1.50 | 8/3 | MiBK | 14 | 0.43 |
| the Invention | 14 | A-10 | 42.9 | 0.3 | 11.7 | A | 6 | 60.8 | 0.1 | 11 | G | 6 | 1.56/1.50 | 4/3 | MiBK | 14 | 0.43 |
| the Invention | 15 | A-11 | 42.9 | 0.3 | 11.7 | A | 6 | 60.8 | 0.1 | 11 | G | 6 | 1.56/1.50 | 16/3 | MiBK | 14 | 0.43 |
| the Invention | 16 | A-12 | 42.9 | 0.3 | 11.7 | A | 6 | 60.8 | 0.1 | 11 | G | 6 | 1.55/1.50 | 4/3 | MiBK | 14 | 0.86 |
| the Invention | 17 | A-13 | 46.6 | 0.25 | 11.6 | E | 12 | 60.8 | 0.1 | 11 | G | 6 | 1.54/1.50 | 12/3 | MiBK | 14 | 0.43 |
| the Invention | 18 | A-14 | 46.8 | 0.2 | 11.5 | F | 6 | 60.8 | 0.1 | 11 | G | 6 | 1.56/1.50 | 16/3 | MiBK | 14 | 0.43 |
| the Invention | 19 | A-15 | 42.9 | 0.3 | 11.7 | A | 6 | 60.8 | 0.1 | 11 | G | 6 | 1.56/1.50 | 7/2 | MiBK | 8.5 | 0.71 |
| the Invention | 20 | A-15 | 42.9 | 0.3 | 11.7 | A | 6 | 60.8 | 0.1 | 11 | G | 6 | 1.56/1.50 | 7/2 | MiBK | 11 | 0.55 |
| the Invention | 21 | A-15 | 42.9 | 0.3 | 11.7 | A | 6 | 60.8 | 0.1 | 11 | G | 6 | 1.56/1.50 | 7/2 | MiBK | 14 | 0.43 |
| the Invention | 22 | A-15 | 42.9 | 0.3 | 11.7 | A | 6 | 60.8 | 0.1 | | | | | | | | |
| Comparative Example | 101 | A-16 | 42.9 | 0.3 | 11.7 | A | 6 | — | — | | | | | | | | |
| Comparative Example | 102 | A-17 | 22.5 | 2.1 | 25 | I | 6 | — | — | | | | | | | | |

TABLE 1-continued

| | | | | | | | | |
|---|---|---|---|---|---|---|---|---|
| Comparative Example | — | — | — | 1.56 | 8/0 | MiBK | 14 | 0.43 |
| Comparative Example | — | — | — | 1.60 | 8/0 | MiBK | 14 | 0.43 |

(2) Formation of Low-Refractivity Layer:

The roll of triacetyl cellulose film coated with the antiglare layer or the diffusive layer is again unrolled, and coated with the above-mentioned coating liquid for low-refractivity layer, according to the above-mentioned die coating method using a slot die, at a traveling speed of 30 m/min, then dried at 90° C. for 75 seconds, and irradiated with WV rays from an air-cooled metal halide lamp (240 W/cm, by Eyegraphics) at an illumination intensity of 400 mW/cm$^2$ and at an irradiation dose of 240 mJ/cm$^2$, under nitrogen purging to be in an atmosphere having an oxygen concentration of from 0.01 to 0.1%, thereby forming a low-refractivity layer having a thickness of 100 nm. Thus produced, the antiglare or diffusive antireflection film is rolled up. In the same manner as that for the antiglare antireflection film, Sample No. 21, an antiglare antireflection film, Sample No. 211 is produced, in which the same antiglare layer as in Sample No. 21 is formed but the coating liquid L-5 for low-refractivity layer is used in place of the coating liquid L-1.

(Saponification of Antireflection Film)

After coated, the sample is processed for the treatment mentioned below. An aqueous sodium hydroxide solution (1.5 mol/L) is prepared and kept at 55° C. An aqueous dilute sulfuric acid solution (0.01 mol/L) is prepared, and kept at 35° C. The formed antireflection film is dipped in the above aqueous sodium hydroxide solution for 2 minutes, and then dipped in water to fully wash away the aqueous sodium hydroxide solution. Next, this is dipped in the above aqueous dilute sulfuric acid solution for 1 minute, and then dipped in water to fully wash away the aqueous dilute sulfuric acid solution. Finally, the sample is fully dried at 120° C. According to the process, saponified antireflection films (samples of the invention 1 to 22 and 211, and comparative samples 101 and 102) are produced.

(Production of Polarizing Plate)

Iodine is adsorbed by polyvinyl alcohol, which is stretched to prepare a polarizer. A triacetyl cellulose film having a thickness of 80 μm (TAC-TD80U, by FUJIFILM) is dipped in an aqueous NaOH solution (1.5 mol/L) at 55° C. for 2 minutes, then neutralized and washed with water, and this is stuck to one surface of the polarizer prepared in the above. The above-mentioned film sample (saponified) is stuck to the other surface of the polarizer.

According to the process, a polarizing plate is produced, comprising the polarizer protected on both surfaces thereof.

(Evaluation of Antireflection Film and Polarizing Plate)

Thus produced, the antireflection film samples are evaluated in point of the following matters. The results are shown in Table 2.

(1) Surface Condition:

The surface roughness Ra, the mean mountain-to-valley distance Sm, the mean tilt angle θa, and the maximum tilt angle θp are measured in the manner mentioned below.

Surface Roughness (Ra):

According to JIS-B0601 (1982) and using Kosaka Laboratories' Surfcorder Model SE-3F, the center line mean roughness (Ra) (μm) is measured.

The test condition is as follows: The test length is 2.5 mm, the cut-off is 0.25 mm, the speed is 0.5 mm/sec, the probe diameter is 2 μm, and the load is 30 μN.

Mean Mountain-to-Valley Distance Sm:

The distance of the mountain-valley period is determined from the crossings at which the roughness curve crosses the center line, and the data are averaged to be a mean value Sm (μm). Kosaka Laboratories' Surfcorder Model SE-3F is used for the measurement. In the Table, "-" means immeasurable.

The test condition is as follows: The test length is 2.5 mm, the cut-off is 0.25 mm, the speed is 0.5 mm/sec, the probe diameter is 2 μm, and the load is 30 μN.

Mean Tilt Angle (θa), Maximum Tilt Angle (θp):

From the data measured according to the method described in the above and using SXM520-AS150 Model by Micromap (USA), θa and θp are computed.

(2) Haze:

[1] The total haze value (H) of the produced antireflection film is measured according to JIS-K7136.

[2] A few drops of silicon oil are applied to the surface and the back of the antireflection film, which is sandwiched between two sheets of glass (microslide glass Code No. S 9111, by Matsunami) each having a thickness of 1 mm, and the two glass sheets and the film are kept in completely airtight contact with each other and the surface haze is thus removed. In this condition, the haze of the film is measured. On the other hand, silicon oil alone is sandwiched between two sheets of glass, and the haze is measured. The value computed by subtracting the latter from the former is the internals haze (Hi) of the film.

[3] From the total haze (H) measured in the above [1], the internal haze (Hi) computed in the above [2] is subtracted to give the surface haze (Hs) of the film.

[4] Δ internal haze after high-temperature high-humidity test:

The internal haze measured in the above [2] is taken as an initial value. After a high-temperature high-humidity test (65° C. and 95% RH for 168 hours), the internal haze of the sample is measured according to the same test method as in [2], and this is taken as a value after test. The initial value is subtracted from the value after test to give Δ internal haze value. In the Table, the + value means that the value after test is higher; and the − value means that the value after test is lower.

(3) Mean Reflectivity:

The back of an antireflection film sample (on the side of the triacetyl cellulose film) is roughened with sand paper, and then processed with black ink to remove back reflection. In this condition, the spectral reflectivity on the surface of the sample is measured with a spectrophotometer (by Nippon Bunko) in a wavelength range of from 380 to 780 nm. As the result, the arithmetical mean value of the integrated reflectivity data in a range of from 450 to 650 nm is taken. The evaluation result of every sample is shown in Table 2.

TABLE 2

| | Sample No. | Coating Liquid for Low-Refractivity Layer | Surface Haze (%) | Internal Haze (%) | Δ Internal Haze after high-temperature high-humidity test (%) | Integrated Reflectivity (%) | Ra (μm) | Sm (μm) | θa (μm) | θp (μm) |
|---|---|---|---|---|---|---|---|---|---|---|
| the Invention | 1 | L-1 | 2.1 | 13 | +1 | 1.7 | 0.1 | 70 | 1.2 | 0.2 |
| the Invention | 2 | L-1 | 2.4 | 23 | +2 | 1.7 | 0.15 | 72 | 1.3 | 0.2 |
| the Invention | 3 | L-1 | 0.5 | 18 | +2 | 1.7 | 0.06 | 92 | 0.6 | 0.1 |
| the Invention | 4 | L-1 | 1.2 | 15 | +1 | 1.7 | 0.09 | 75 | 1.0 | 0.2 |
| the Invention | 5 | L-1 | 7.1 | 12 | +2 | 1.7 | 0.21 | 65 | 1.7 | 0.2 |
| the Invention | 6 | L-1 | 1.6 | 15 | +2 | 1.7 | 0.08 | 81 | 1.1 | 0.2 |
| the Invention | 7 | L-1 | 8.2 | 11 | +1 | 1.8 | 0.22 | 64 | 1.8 | 0.2 |
| the Invention | 8 | L-1 | 3.4 | 22 | +2 | 1.7 | 0.17 | 73 | 1.4 | 0.2 |
| the Invention | 9 | L-1 | 2.7 | 21 | +2 | 1.7 | 0.16 | 72 | 1.4 | 0.2 |
| the Invention | 10 | L-1 | 2.7 | 14 | −1 | 1.7 | 0.16 | 72 | 1.3 | 0.2 |
| the Invention | 12 | L-2 | 2.6 | 21 | +2 | 2.8 | 0.16 | 72 | 1.4 | 0.2 |
| the Invention | 13 | L-3 | 2.2 | 22 | +2 | 2.0 | 0.17 | 69 | 1.4 | 0.2 |
| the Invention | 14 | L-4 | 2.6 | 21 | +2 | 3.1 | 0.16 | 70 | 1.3 | 0.2 |
| the Invention | 15 | L-1 | 1.7 | 14 | +1 | 1.7 | 0.04 | 101 | 1.1 | 0.1 |
| the Invention | 16 | L-1 | 9.4 | 32 | +3 | 1.9 | 0.26 | 54 | 1.9 | 0.3 |
| the Invention | 17 | L-1 | 1.2 | 9 | +1 | 1.6 | 0.05 | 62 | 0.4 | 0.1 |
| the Invention | 18 | L-1 | 0.1 | 14 | +1 | 1.7 | 0.01 | 120 | 0.2 | 0.2 |
| the Invention | 19 | L-1 | 2.1 | 0.8 | ±0 | 1.8 | 0.14 | 71 | 1.3 | 0.2 |
| the Invention | 20 | L-1 | 3.5 | 13 | +1 | 1.7 | 0.1 | 65 | 1.4 | 0.2 |
| the Invention | 21 | L-1 | 2.8 | 17 | +2 | 1.7 | 0.11 | 75 | 1.3 | 0.2 |
| the Invention | 22 | L-1 | 2.0 | 21 | +2 | 1.7 | 0.12 | 80 | 1.3 | 0.2 |
| the Invention | 211 | L-5 | 2.8 | 17 | +1 | 3.2 | 0.11 | 75 | 1.3 | 0.2 |
| Comparative Example | 101 | L-1 | 2.2 | 11 | +7 | 1.7 | 0.11 | 70 | 1.2 | 0.2 |
| Comparative Example | 102 | L-1 | 4.2 | 29 | +14 | 1.8 | 0.23 | 72 | 1.7 | 0.2 |

The results in Table 2 confirm the following: In the antireflection film of the invention comprising high-crosslinking high-refractivity resin particles, the internal haze after the high-temperature high-humidity test is prevented from fluctuating.

Example 2

Iodine is adsorbed by polyvinyl alcohol, which is stretched to prepare a polarizing film. A triacetyl cellulose film (TAC-TD80U, by FUJIFILM) is dipped in an aqueous NaOH solution (1.5 mol/L) at 55° C. for 2 minutes, then neutralized and washed with water. The sample (saponified) of the invention in Example 1. These are stuck to the two surfaces to the polarizing film to protect it, thereby producing a polarizing plate. Thus produced, the polarizing plate is replaced for the polarizing plate on the viewing side of a notebook-size liquid-crystal display device carrying a transmission-type TN-mode liquid-crystal display device built therein (this has a polarization separation film having a polarization selective layer, Sumitomo 3M's D-BEF between the backlight and the liquid-crystal cell therein) in such a manner that the antiglare layer or the diffusive layer can be the outermost surface of the device. Thus reconstructed, the display device is excellent in the antiglare property and the denseness of black in displays, free from a problem of reflection of background scenes on the panel surface and excellent in the light room contrast, and has an extremely high-level display quality.

Example 3

As the protective film on the liquid-crystal cell side of the polarizing plate on the viewing side of the transmission-type TN-mode liquid-crystal cell to which the film sample of the invention of Example 1 has been stuck, and as the protective film on the liquid-crystal cell side of the polarizing plate on the backlight side thereof, an optically-compensatory film (Wide-View Film-Ace, by FUJIFILM) is used. Thus reconstructed, the liquid-crystal display device is excellent in the antiglare property and the denseness of black in displays, free from a problem of reflection of background scenes on the panel surface and excellent in the light room contrast, and has an extremely high-level display quality. In addition, the viewing angle both in the vertical direction and in the horizontal direction of the device is extremely broad, and the device is extremely excellent in the image visibility.

Example 4

The polarizing plate originally in a VA-mode liquid-crystal display device (LC-26GD3, by Sharp) is peeled away with its retardation film kept as such, and in place of it, a polarizing plate of the invention is stuck to the device in such a manner that the transmission axis thereof may be the same as that of the original polarizing plate in the device. Thus reconstructed, the display device is excellent in the antiglare property and the denseness of black in displays, free from a problem of reflection of background scenes on the panel surface and excellent in the light room contrast, and has an extremely high-level display quality.

Having such an excellent antiglare effect, it has been confirmed that the display device comprising the polarizing plate of the invention has an extremely good display capability excellent in the contrast in oblique directions.

Example 5

The polarizing plate originally in an IPS-mode liquid-crystal display device (TH-26LX300, by Matsushita) is peeled away, and in place of it, a polarizing plate of the invention is stuck to the device in such a manner that the transmission axis thereof may be the same as that of the original polarizing plate in the device. Thus reconstructed, the display device is excellent in the antiglare property and the denseness of black in displays, free from a problem of reflection of background scenes on the panel surface and excellent in the light room contrasts and has an extremely high-level display quality.

Example 6

The film sample of the invention in Example 1 is stuck to the glass sheet on the surface of an organic EL display device. On the glass surface of the thus-reconstructed display device, reflection is prevented, and the display device has excellent image visibility.

Example 7

Using the antireflection film sample of the invention in Example 1, a polarizing plate is produced, having the antireflection film of the invention on one surface thereof. To the other surface of the polarizing plate opposite to the surface thereof having the antireflection film of the invention stuck thereto, a λ/4 plate is stuck. The polarizing plate is stuck to the glass sheet on the surface of an organic EL display device in such a manner that the antireflection film of the invention can be the outermost surface of the device. In the thus-constructed display device, the surface reflection and the internal reflection inside the surface glass are cut off, and the display device has excellent image visibility.

In the above Examples where the antireflection film of the invention is used, the antireflection film exhibits excellent properties for use on the surface of display devices.

According to the invention, there is provided an antireflection film excellent in producibility, capable of overcoming a problem of display characteristic unevenness in display devices, and especially excellent in long-term durability under high-temperature high-humidity conditions that is needed by TV panels and monitors. Further, according to the invention, there is also provided a polarizing plate and an image display device comprising the antireflection film and excellent in long-term durability under high-temperature high-humidity conditions.

The entire disclosure of each and every foreign patent application from which the benefit of foreign priority has been claimed in the present application is incorporated herein by reference, as if fully set forth.

What is claimed is:

1. An antireflection film comprising, in the following order:
    a transparent support;
    at least one antiglare layer or diffusive layer containing a transparent resin and light-transmissive resin particles; and
    a low-refractivity layer having a refractive index lower than that of any of the transparent support and the antiglare layer or diffusive layer,
wherein
    the transparent resin is formed by curing a mixture containing (A) a polyfunctional (meth)acrylate having at least two (meth)acryloyl groups, and (B) a modified polyfunctional (meth)acrylate modified through addition of any of ethylene oxide, propylene oxide or caprolactone, and
    the light-transmissive resin particles contain (C) high-crosslinking light-transmissive resin particles which are made from crosslinked methyl (meth)acrylate/styrene copolymer and have a residual monomer content of at most 2.0% and which have a compression strength of from 39 to 98 N/mm$^2$, wherein
    the antiglare layer or diffusive layer has a thickness (t) of from 8 μm to 15 μm,
    the high-crosslinking light-transmissive resin particles (C) have a mean particle size (φC) of from 5.5 μm to 10 μm,
    the high-crosslinking light-transmissive resin particles (C) have a refractive index (npC) of from 1.55 to 1.58, and
    (φC/t), which is a ratio of the mean particle size (φC) to the thickness (t), is from 0.30 to 0.75.

2. The antireflection film as claimed in claim 1, wherein in the modified polyfunctional (meth)acrylate (B), the addition molar number of ethylene oxide and propylene oxide is from 1 to 3, or the addition molar number of caprolactone is from 3 to 10.

3. The antireflection film as claimed in claim 1, wherein
    the polyfunctional (meth)acrylate (A) has a mean molecular weight of from 200 to 600, and
    the modified polyfunctional (meth)acrylate (B) has a mean molecular weight of from 300 to 2000.

4. The antireflection film as claimed in claim 1, wherein
    the antiglare layer or diffusive layer further contains (D) second high-crosslinking light-transmissive resin particles, and
    the second high-crosslinking light-transmissive resin particles (D) have substantially the same particle size as that of the high-crosslinking light-transmissive resin particles (C).

5. The antireflection film as claimed in claim 4, wherein the second high-crosslinking light-transmissive resin particles (D) have a refractive index of from 1.49 to 1.54.

6. The antireflection film as claimed in claim 1, wherein a swelling degree of the light-transmissive resin particles, after dipped in a dispersion solvent, is at most 20% by volume.

7. The antireflection film as claimed in claim 1, wherein
    the high-crosslinking light-transmissive resin particles (C) are crosslinked by a bifunctional or more polyfunctional crosslinking monomer, and
    the crosslinking monomer is contained in an amount of at least 15% by mass relative to all monomers to form the high-crosslinking light-transmissive resin particles (C).

8. A polarizing plate comprising:
    a polarizing film; and
    two protective films that protect both surfaces of the polarizing film,
    wherein at least one of the protective films is the antireflection film of claim 1.

9. An image display device comprising: the antireflection film of claim 1.

10. An antireflection film comprising, in the following order:
    a transparent support;
    at least one antiglare layer or diffusive layer containing a transparent resin and light-transmissive resin particles; and
    a low-refractivity layer having a refractive index lower than that of any of the transparent support and the antiglare layer or diffusive layer,
wherein
    the transparent resin is formed by curing a mixture containing (A) a polyfunctional (meth)acrylate having at least two (meth)acryloyl groups, and (B) a modified polyfunctional (meth)acrylate modified through addition of any of ethylene oxide, propylene oxide or caprolactone, and
    the light-transmissive resin particles contain (C) high-crosslinking light-transmissive particles which are made from crosslinked methyl (meth)acrylate/styrene copolymer and have a residual monomer content of at most 2.0% and which have a compression strength of from 39 to 98 N/mm$^2$, wherein the high-crosslinking light-transmissive resin particles (C) are crosslinked by a bifunctional or more polyfunctional crosslinking monomer, and the crosslinking monomer is contained in an amount of at least 15% by mass relative to all monomers to form the high-crosslinking light-transmissive resin particles (C).

11. The antireflection film as claimed in claim 10, wherein in the modified polyfunctional (meth)acrylate (B), the addition molar number of ethylene oxide and propylene oxide is from 1 to 3, or the addition molar number of caprolactone is from 3 to 10.

12. The antireflection film as claimed in claim 10, wherein the polyfunctional (meth)acrylate (A) has a mean molecular weight of from 200 to 600, and
the modified polyfunctional (meth)acrylate (B) has a mean molecular weight of from 300 to 2000.

13. The antireflection film as claimed in claim 10, wherein the antiglare layer or diffusive layer has a thickness (t) of from 8 μm to 15 μm,
the high-crosslinking light-transmissive resin particles (C) has a mean particle size (φC) of from 5.5 μm to 10 μm,
the high-crosslinking light-transmissive resin particles (C) has a refractive index (npC) of from 1.55 to 1.58, and
(φC/t), which is a ratio of the mean particle size (φC) to the thickness (t), is from 0.30 to 0.75.

14. The antireflection film as claimed in claim 10, wherein the antiglare layer or diffusive layer further contains (D) second high-crosslinking light-transmissive resin particles, and
the second high-crosslinking light-transmissive resin particles (D) have substantially the same particle size as that of the high-crosslinking light-transmissive resin particles (C).

15. The antireflection film as claimed in claim 10, wherein the second high-crosslinking light-transmissive resin particles (D) have a refractive index of from 1.49 to 1.54.

16. The antireflection film as claimed in claim 10, wherein a swelling degree of the light-transmissive resin particles, after dipped in a dispersion solvent, is at most 20% by volume.

17. A polarizing plate comprising:
a polarizing film; and
two protective films that protect both surfaces of the polarizing film,
wherein at least one of the protective films is the antireflection film of claim 10.

18. An image display device comprising: the antireflection film of claim 10.

* * * * *